(12) United States Patent
Ren et al.

(10) Patent No.: US 12,486,229 B2
(45) Date of Patent: Dec. 2, 2025

(54) INDOLE DERIVATIVE AND APPLICATION THEREOF

(71) Applicant: SHANGHAI MEDICILON INC., Shanghai (CN)

(72) Inventors: Feng Ren, Shanghai (CN); Yubin Lv, Shanghai (CN); Hailong Wang, Shanghai (CN); Yueying Ren, Shanghai (CN); Chunlin Chen, Shanghai (CN); Yangchun Luo, Shanghai (CN); Jinna Cai, Shanghai (CN); Bangliang Li, Shanghai (CN)

(73) Assignee: SHANGHAI MEDICILON INC., Shanghai (CN)

( * ) Notice: Subject to any disclaimer, the term of this patent is extended or adjusted under 35 U.S.C. 154(b) by 493 days.

(21) Appl. No.: 18/013,688

(22) PCT Filed: Jul. 2, 2021

(86) PCT No.: PCT/CN2021/104138
§ 371 (c)(1),
(2) Date: Dec. 29, 2022

(87) PCT Pub. No.: WO2022/002225
PCT Pub. Date: Jan. 6, 2022

(65) Prior Publication Data
US 2023/0357148 A1  Nov. 9, 2023

(30) Foreign Application Priority Data
Jul. 3, 2020 (CN) .......................... 202010638390.0

(51) Int. Cl.
*C07D 209/32* (2006.01)
*A61P 1/06* (2006.01)

(52) U.S. Cl.
CPC .............. *C07D 209/32* (2013.01); *A61P 1/06* (2018.01)

(58) Field of Classification Search
CPC .. C07D 209/32; C07D 209/08; C07D 209/12; A61P 1/06; A61P 1/00; A61P 1/04;
(Continued)

(56) References Cited

U.S. PATENT DOCUMENTS 12,195,457 B2 *   1/2025  Lu .......................... A61P 31/00
2006/0258722 A1  11/2006  Yasuma et al.

FOREIGN PATENT DOCUMENTS

CN       101291908 A    10/2008
JP       2007262009 A   10/2007
(Continued)

*Primary Examiner* — Taylor V Oh
(74) *Attorney, Agent, or Firm* — Alleman Hall & Tuttle LLP

(57) ABSTRACT

The invention relates to an indole derivative shown in general formula (I-1) and its use in preparing drugs for preventing and/or treating indications of S1P receptor related disorders. The indole derivative of the invention is replaced by $R^1$, $R^2$, $R^5$, and $R^6$ at different sites respectively, and the obtained modified indole derivative has excellent biological activity and is an ideal S1P receptor regulator with high efficiency. Compounds of general formula (I-1) can be used to treat and/or prevent Crohn's disease, ulcerative colitis, psoriasis, rheumatoid arthritis, multiple sclerosis, atopic dermatitis, eosinophilic esophagitis, alopecia areata, primary cholangitis, pyoderma gangrenosum, graft-versus-host disease, amyotrophic lateral sclerosis, systemic lupus erythematosus, type I diabetes arteriosclerosis, atherosclerosis, scleroderma, autoimmune hepatitis, acne, microbial infection, viral infection, and other autoimmune and inflammatory diseases.

(Continued)

MODEL GROUP

SULFASALAZINE (360mg/kg)

COMPOUND OF EXAMPLE 3 (3mg/kg)

OZANIMOD (10mg/kg)

ETRASIMOD (3mg/kg)

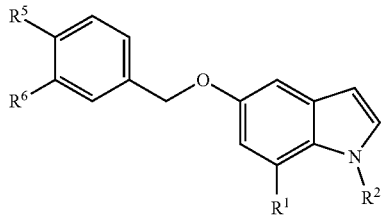

(I-1)

3 Claims, 1 Drawing Sheet

(58) Field of Classification Search
CPC .... A61P 3/10; A61P 9/10; A61P 17/00; A61P 19/02; A61P 21/00; A61P 25/00; A61P 29/00; A61P 31/00; A61P 31/04; A61P 31/10; A61P 31/12; A61P 37/00; A61P 37/02; Y02A 50/30; Y02P 20/55; A61K 31/405; A61K 31/404
USPC ........................................................ 514/415
See application file for complete search history.

(56) References Cited

FOREIGN PATENT DOCUMENTS

| WO | 2004063190 A1 | 7/2004 |
| WO | 2007024922 A1 | 3/2007 |
| WO | 2007106469 A2 | 9/2007 |
| WO | 2020114475 A1 | 6/2020 |

* cited by examiner

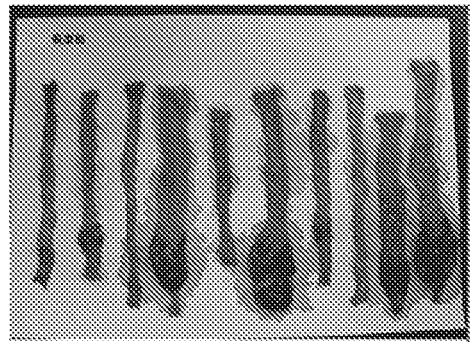
MODEL GROUP
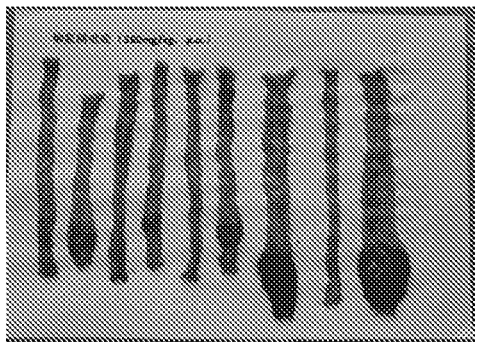
SULFASALAZINE (360mg/kg)
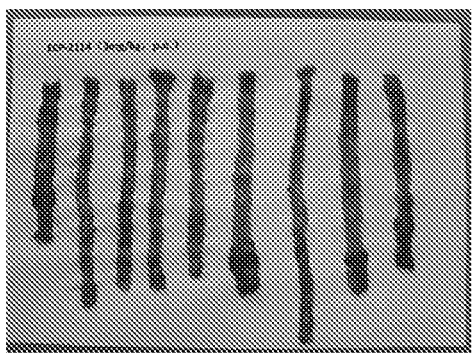
COMPOUND OF EXAMPLE 3 (3mg/kg)
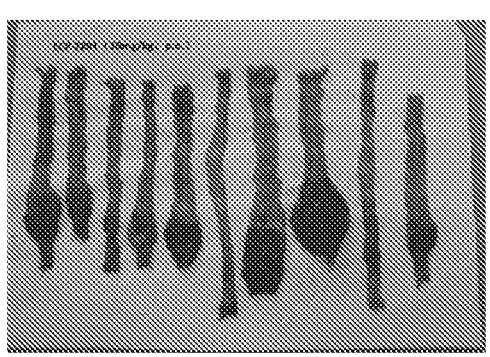
OZANIMOD (10mg/kg)
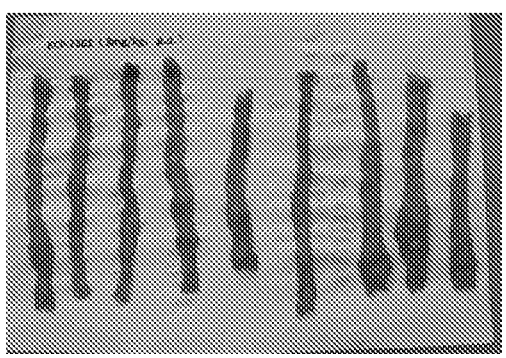
ETRASIMOD (3mg/kg)

INDOLE DERIVATIVE AND APPLICATION THEREOF

CROSS REFERENCE TO RELATED APPLICATIONS

This application is a U.S. National Phase of International Patent App. No. PCT/CN2021/104138, filed Jul. 2, 2021, which claims the priority of an earlier application submitted to the State Intellectual Property Office of the People's Republic of China on Jul. 3, 2020, with the patent application number of 202010638390.0 and the title of the invention of "An Indole Derivative And Its Application." The full text of each of these applications is incorporated into the present application by reference.

TECHNICAL FIELD

The present invention relates to the field of pharmaceutical chemistry and relates to an indole derivative, its preparation method, and its use in preparing drugs for preventing and/or treating indications related to S1P receptor related disorders.

BACKGROUND

Sphingosine 1-phosphate receptor (S1PR) belongs to the family of G-protein coupled receptors. At present, five subtypes have been found, namely S1PR1, 2, 3, 4, and 5. Different subtypes are distributed differently in different tissues. Among them, S1PR1, 2, and 3 are widely distributed, S1PR4 is mainly expressed in blood cells and lymphocytes, and S1PR5 is expressed in skin and central system. S1PR1 can produce immunosuppression by controlling the migration of lymphocytes, and S1PR3 can cause acute toxicity and bradycardia, thus resulting in side effects.

S1PR1 regulator can be used to treat various immune diseases, such as multiple sclerosis, ulcerative colitis, Crohn's disease, systemic lupus erythematosus, atopic dermatitis, eosinophilic esophagitis, alopecia areata, primary cholangitis, gangrenous pyoderma, psoriasis, rheumatoid arthritis, graft-versus-host disease, etc.

The S1PR regulator has been marketed in three drugs for multiple sclerosis, namely, Novartis's Fengomod (targets S1PR1, 3, 4, 5), Sinimod (targets S1PR1, 5), and as well as BMS's ozanismod (targets S1PR1, 5). Among them, in addition to multiple sclerosis, ozanimod also completed the phase III clinical study for ulcerative colitis, and the phase III clinical trial for Crohn's disease is in progress. Furthermore, there are many drugs in research and development, such as Johnson & Johnson's ponesimod for multiple sclerosis entering NDA status, Arena's etrasimod for ulcerative colitis and Crohn's disease in Phase III clinical study, Idorsia's cenerimod for systemic lupus erythematosus in Phase II clinical study, etc.

Inflammatory bowel disease (IBD) is a chronic intestinal disease of unknown etiology. The main types are ulcerative colitis (UC) and Crohn's disease (CD). IBD has affected 5 million people around the world. Developed countries such as Europe and the United States have experienced rapid development, with the current incidence rate of about 30/100,000. Asia has become the fastest growing region, with the soaring new cases in recent decades. At present, the total number of IBD cases in China is about 400,000, which is the Asian country with the highest incidence rate of IBD. Especially in the past 10 years, UC has increased more than 2.3 times, and CD has even increased more than 15 times.

Treatment drugs for IBD mainly include three classical drugs of 5-aminosalicylic acid, glucocorticoid, and immunosuppressant, but their efficacy is limited and they are accompanied by many immunosuppressive adverse reactions. With a large number of studies on IBD and the positive role of the development of evidence-based medicine in promoting treatment, the treatment of IBD is entering the biological era of immune regulation, mainly including pro-inflammatory cytokine inhibitors, anti-inflammatory cytokines, cell adhesion molecule inhibitors, T-cell antibodies, etc. The rapid development of these drugs has greatly enriched the treatment of IBD and opened up new ideas for the treatment of IBD, especially severe and refractory IBD. However, there are still many patients who have received treatment and have not been relieved. Up to 80% of CD patients and 30% of UC patients end up needing surgery. There are still huge medical needs in this field that have not been met.

SUMMARY OF THE INVENTION

An objective of the present invention is to provide a new indole derivative, a preparation method thereof and its use. The indole derivative of the invention has high activity and good safety, and thus is an ideal S1P receptor regulator.

In order to achieve the above objective, the present invention adopts the following technical solutions.

In one aspect, the invention provides an indole derivative shown in general formula (I):

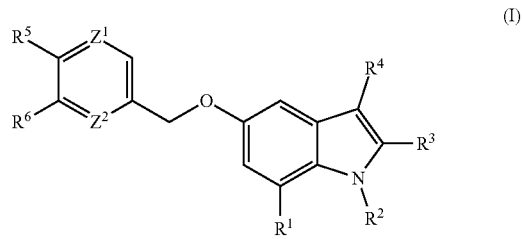

wherein:
$Z^1$ and $Z^2$ are each independently selected from N or $CR^a$;
$R^1$, $R^3$, and $R^4$ are each independently selected from hydrogen, halogen, $C_{1-6}$ alkyl, $C_{1-6}$ alkoxy, 3- to 8-membered cycloalkyl, or 3- to 8-membered heterocyclic group;
$R^2$ is selected from $(CR^bR^c)_m\text{---}(Cy)_p\text{-}(CR^bR^c)_n\text{---}$COOH, $(CR^bR^c)_m\text{---}(Cy)_p\text{-}(CR^bR^c)_n\text{---}$OH, $(CR^bR^c)_m\text{---}(Cy)_p\text{-}(CR^bR^{cb})_n\text{---}$CN, or $(CR^bR^c)_m\text{---}(Cy)_p\text{-}(CR^bR^c)_n\text{---}$CONR$^b$R$^c$;
$R^a$, $R^b$, and $R^c$ are each independently selected from hydrogen, halogen, or $C_{1-6}$ alkyl;
Cy is selected from 3- to 8-membered cycloalkyl or heterocyclic group;
$R^5$ is selected from 3- to 8-membered cycloalkyl or heterocyclic group;
$R^6$ is selected from halogen or halogen-substituted methyl;
the heterocyclic group comprises 1 to 3 heteroatoms selected from N, O, and S; the alkyl, alkoxy, cycloalkyl, or heterocyclic group is optionally substituted by 0 to 6 halogens, $C_{1-6}$ alkyl, or $C_{1-6}$ alkoxy;
m, p, and n are each independently selected from an integer of 0 to 3.

In one embodiment, $R^1$ is selected from hydrogen, halogen, or $C_{1-4}$ alkyl; preferably, $R^1$ is selected from fluorine, chlorine, methyl, ethyl, isopropyl, or isobutyl; more preferably, $R^1$ is selected from chlorine, methyl, or ethyl.

In one embodiment, $Z^1$, $Z^2$ are selected from $CR^a$; $R^2$ is selected from $(CR^bR^c)_m$—$(Cy)_p$-$(CR^bR^c)_n$—COOH, $(CR^bR^c)_m$—$(Cy)_p$-$(CR^bR^c)_n$—OH, or $(CR^bR^c)_m$—$(Cy)_p$-$(CR^bR^c)_n$—C;
  wherein $R^a$, $R^b$, $R^c$ are each independently selected from hydrogen or $C_{1-6}$ alkyl; preferably, $R^a$, $R^b$, $R^c$ are hydrogen;
  Cy is selected from 3- to 8-membered cycloalkyl or heterocyclic group;
  the heterocyclic group comprises 1 to 3 heteroatoms selected from N, O, and S;
  the alkyl, alkoxy, cycloalkyl, or heterocyclic group is optionally substituted by 0 to 6 halogens, $C_{1-6}$ alkyl, or $C_{1-6}$ alkoxy;
  m, p, and n are each independently selected from an integer of 0 to 3.

In one embodiment, $Z^1$, $Z^2$ are selected from CH, and $R^2$ is $(CH_2)_2COOH$ or $(CH_2)_3COOH$.

In one embodiment, $R^3$ is hydrogen, fluorine, chlorine, methyl, ethyl, isopropyl, or isobutyl; preferably, $R^3$ is hydrogen, fluorine, or methyl; more preferably, $R^3$ is hydrogen or fluorine; further preferably, $R^3$ is hydrogen.

In one embodiment, $R^4$ is hydrogen, fluorine, chlorine, methyl, ethyl, isopropyl, or isobutyl; preferably, $R^4$ is hydrogen, fluorine, or methyl; more preferably, $R^4$ is hydrogen or fluorine; further preferably, $R^4$ is hydrogen.

In one embodiment, $R^5$ is selected from 3- to 8-membered cycloalkyl optionally substituted by 0 to 3 halogens or $C_{1-6}$ alkyl, preferably cyclobutyl, clyclopentyl, or cyclohexy, more preferably cyclopentyl.

In one embodiment, $R^6$ is selected from fluorine, monofluoromethyl, difluoromethyl, or trifluoromethyl, preferably fluorine or trifluoromethyl.

In one embodiment, $R^1$ is selected from chlorine, methyl, or ethyl; $R^2$ is selected from $(CH_2)_2$—COOH or $(CH_2)_3$—COOH; $R^3$ and $R^4$ are hydrogen; $R^5$ is cylcopentyl; $R^6$ is trifluoromethyl.

Preferably, the indole derivative described has the structure shown in the general formula (I-1):

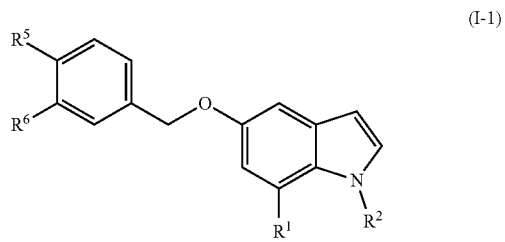

(I-1)

wherein,
$R^1$ is selected from hydrogen, halogen, $C_{1-6}$ alkyl, $C_{1-6}$ alkoxy, 3- to 8-membered cycloalkyl, or 3- to 8-membered heterocycloalkyl;
$R^2$ is selected from $(CR^bR^c)_m$—COOH; m is an integer selected from 0 to 3;
$R^b$ and $R^c$ are each independently selected from hydrogen, halogen or $C_{1-6}$ alkyl;
$R^5$ is selected from 3- to 8-membered cycloalkyl or heterocyclic group;

$R^6$ is selected from halogen or halogen-substituted methyl;
the heterocyclic alkyl group comprises 1 to 3 heteroatoms selected from N, O, and S;
the alkyl, alkoxy, cycloalkyl, or heterocyclic group is optionally substituted by 0 to 6 halogens, $C_{1-6}$ alkyl, or $C_{1-6}$ alkoxy.

In one embodiment, $R^1$ is selected from hydrogen, halogen, $C_{1-3}$ alkyl; $R^2$ is selected from $(CR^bR^c)_m$—COOH; m is an integer selected from 0 to 3; $R^b$ and $R^c$ are each independently selected from hydrogen, halogen, or $C_{1-3}$ alkyl; $R^5$ is selected from 5- to 7-membered cycloalkyl; $R^6$ is selected from halogen or halogen-substituted methyl; the alkyl and cycloalkyl are optionally substituted by 0 to 3 halogens, $C_{1-3}$ alkyl.

In one more specific embodiment, $R^1$ is selected from halogen, $C_{1-3}$ alkyl; $R^2$ is selected from $(CH_2)_m$—COOH; m is independently selected from an integer of 2 to 3; $R^5$ is selected from 5- to 7-membered cycloalkyl; $R^6$ is selected from halogen or methyl substituted by 1 to 3 halogens.

In one more specific embodiment, $R^1$ is selected from fluorine, chlorine, methyl, ethyl; $R^2$ is selected from $(CH_2)_m$—COOH; m is independently selected from an integer of 2 to 3; $R^5$ is selected from cyclopentyl, cyclohexyl; $R^6$ is selected from F, Cl, trifluoromethyl, difluoromethyl, fluoromethyl.

Preferably, indole derivatives of the invention include, but are not limited to, the following compounds:

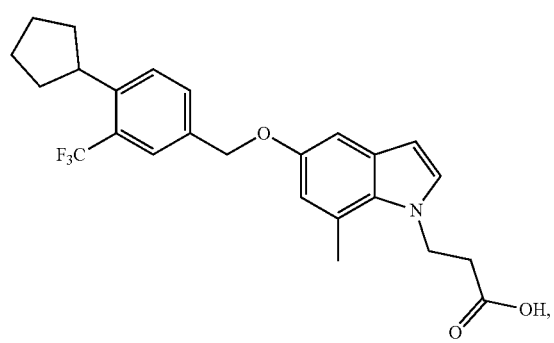

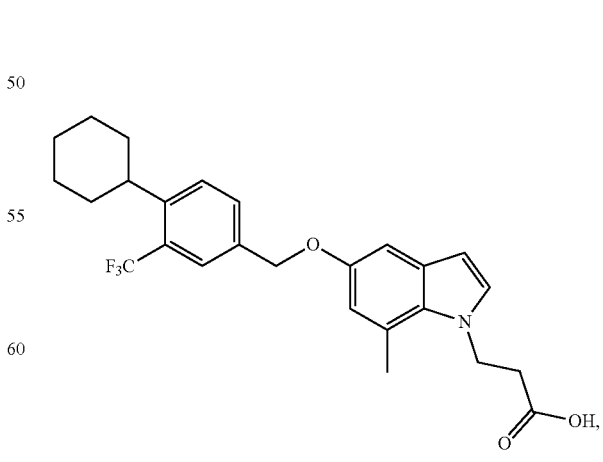

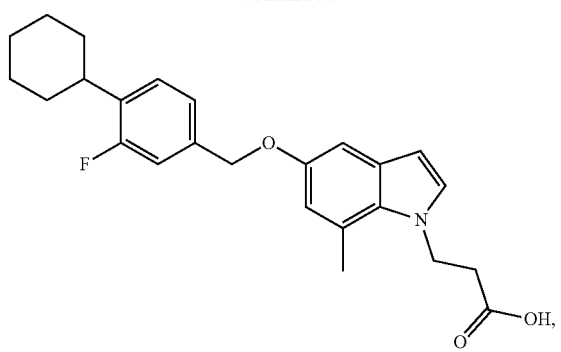
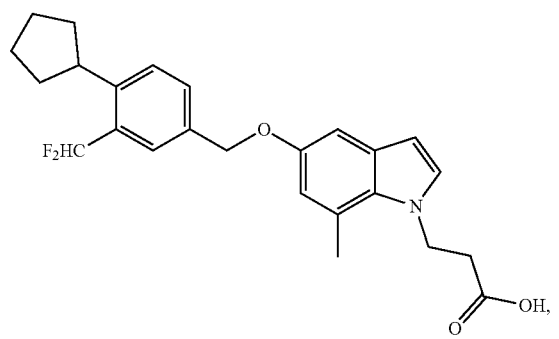
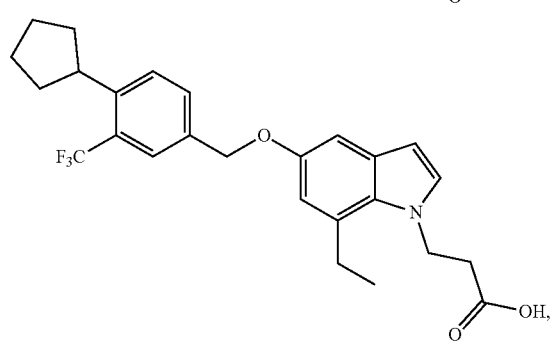
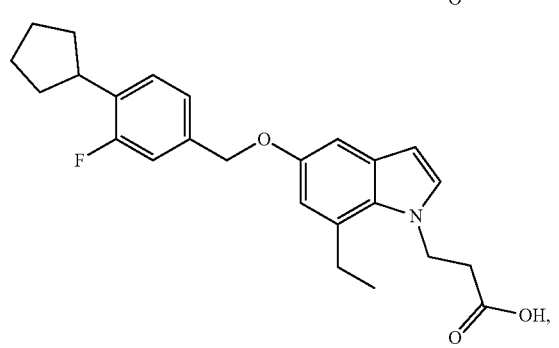
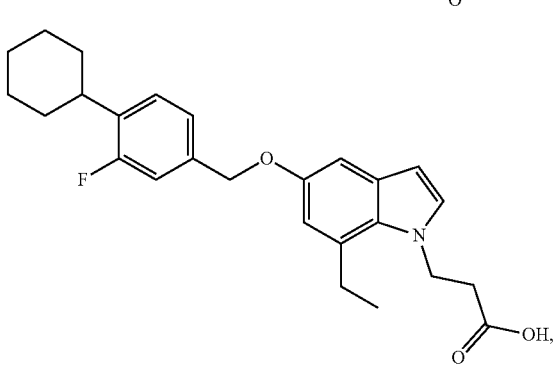
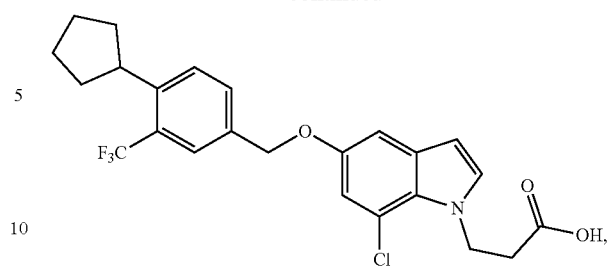
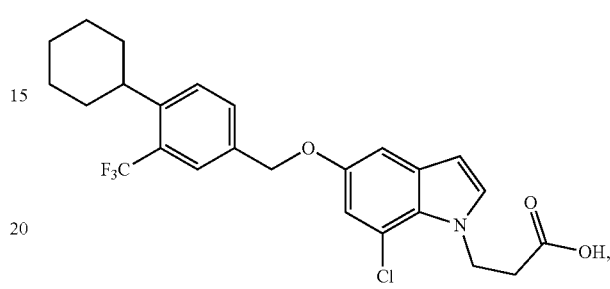
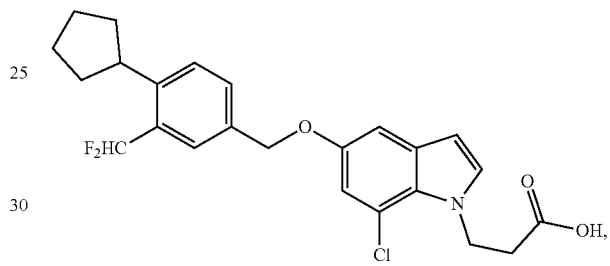
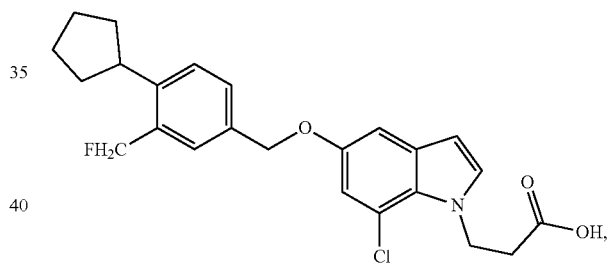
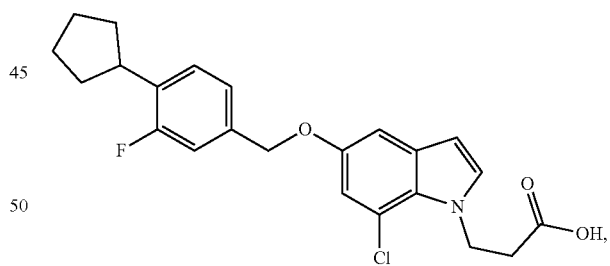
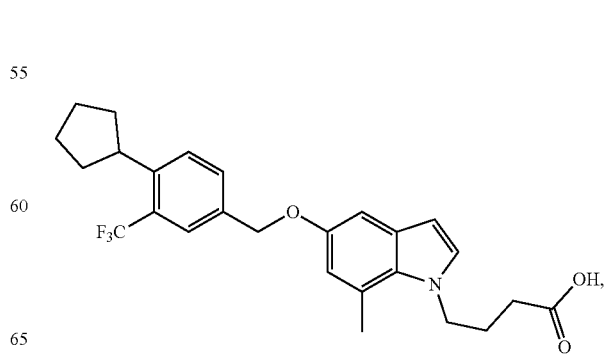

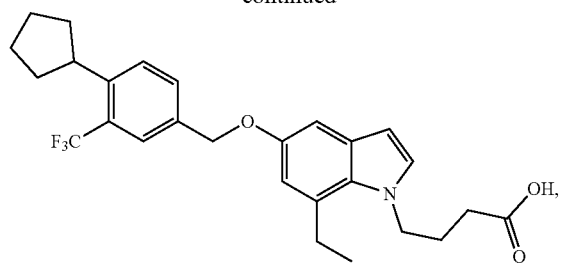
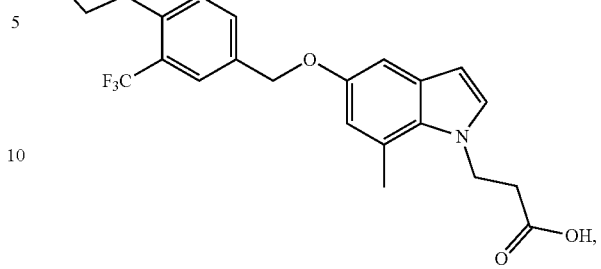
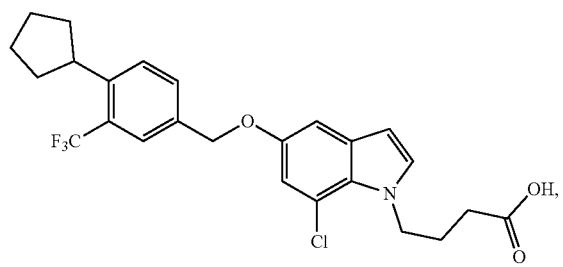
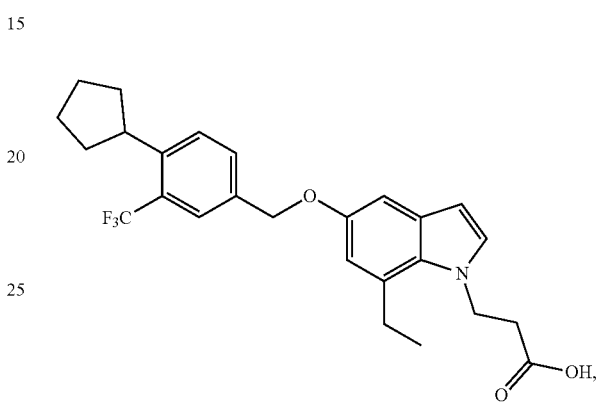
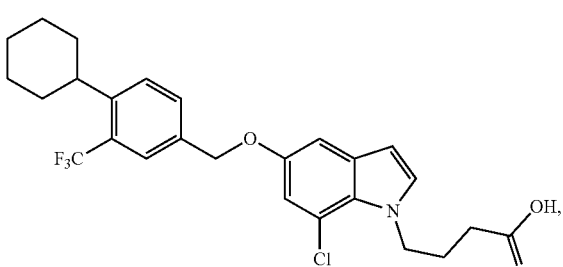
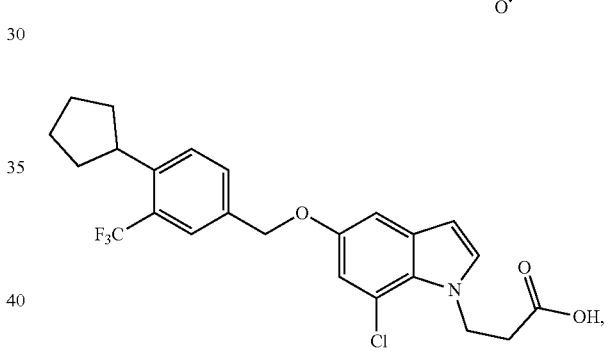
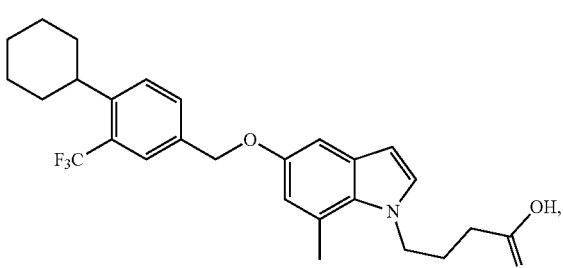
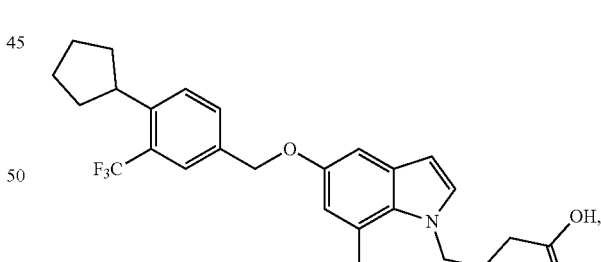
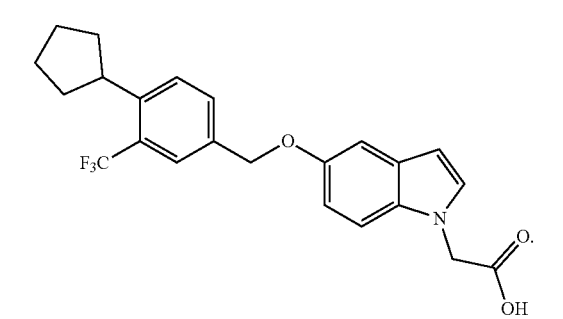
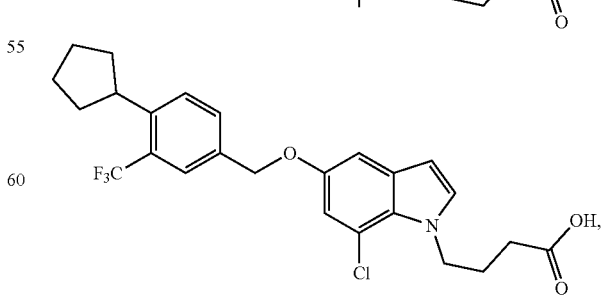
Further preferably, indole derivatives of the invention include but are not limited to the following compounds:

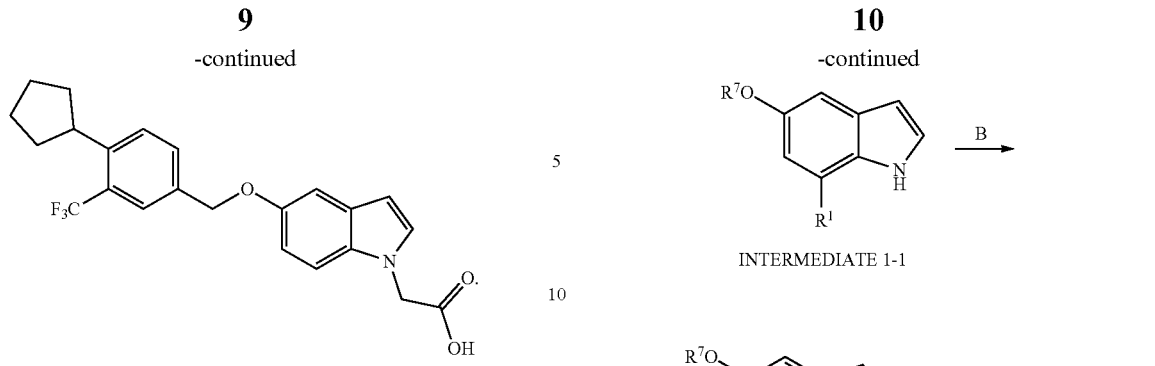

Another objective of the invention is to provide a synthesis method of indole derivatives shown in general formula (I'-1), including the following steps:

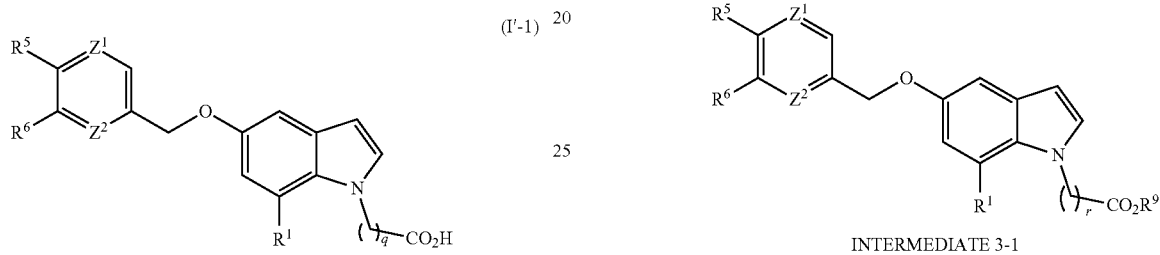

(1) preparing an intermediate 3-1 by two methods using segments A1, B1, and C1:

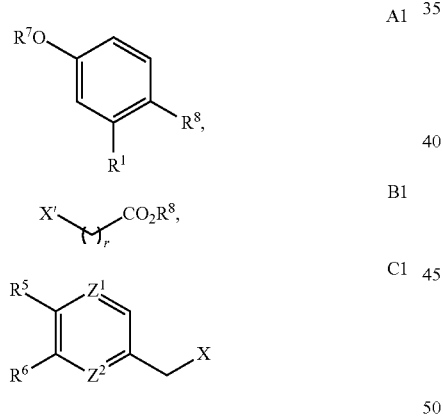

method 1: converting the segment A1 into an intermediate 1-1 with indole ring, introducing the segment B1 into N of the indole ring of the intermediate 1-1 to obtain an intermediate 2-1, and subjecting the intermediate 2-1 to react with the segment C1 to obtain an intermediate 3-1:

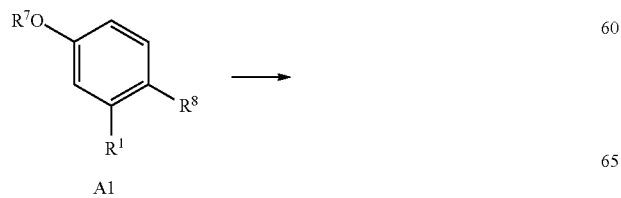

method 2: first subjecting the segment A1 to react with the segment C1 to obtain an intermediate 1'-1, converting the intermediate 1'-1 into an intermediate 2'-1 as indole ring precursor, and introducing the segment B 1 into the intermediate 2'-1 to obtain an intermediate 3-1:

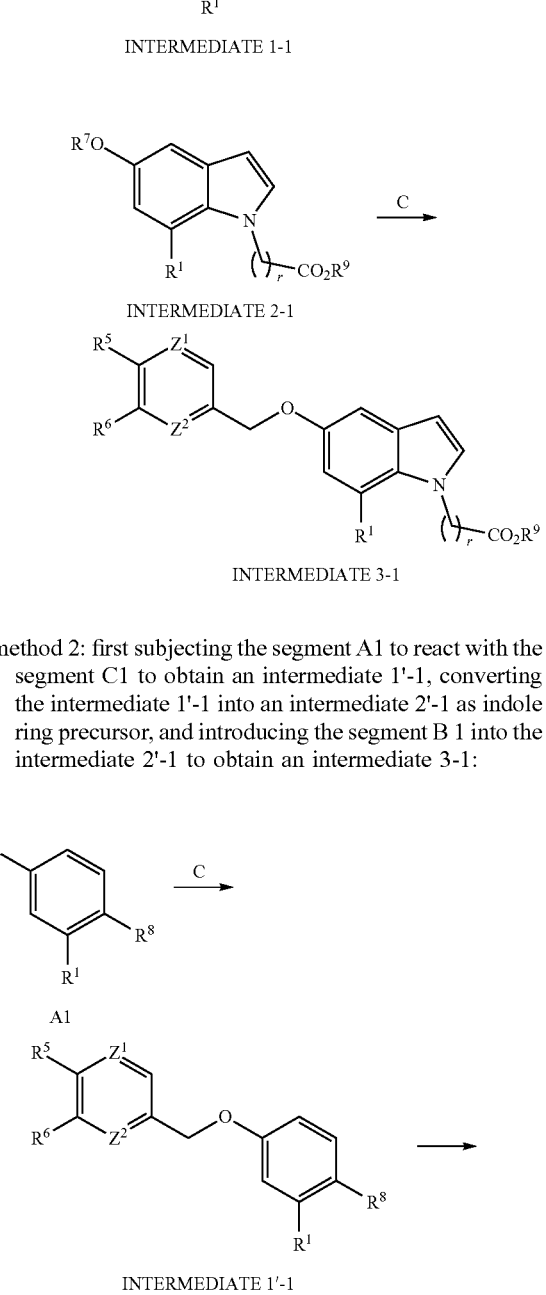

-continued

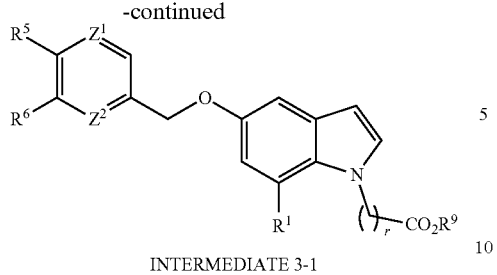

INTERMEDIATE 3-1

(2) hydrolyzing or reducing the intermediate 3-1 to hydroxyl, which is then replaced by CN and hydrolyzed to produce a compound of general formula (I'-1):

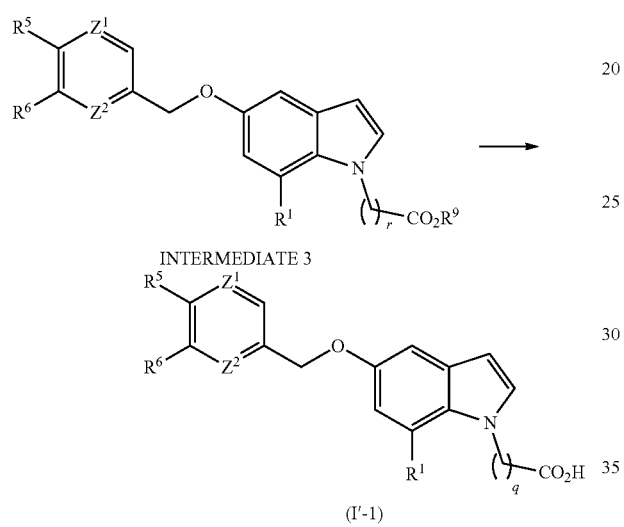

wherein, $Z^1$ and $Z^2$ are each independently selected from N or $CR^a$; $R^1$ is independently selected from hydrogen, halogen, $C_{1-6}$ alkyl, $C_{1-6}$ alkoxy, 3- to 8-membered cycloalkyl or 3- to 8-membered heterocyclic group; $R^5$ is selected from 3- to 8-membered cycloalkyl or heterocyclic group; $R^6$ is selected from halogen or halogen-substituted methyl; $R^a$ is each independently selected from hydrogen, halogen or $C_{1-6}$ alkyl;

$R^7$ is a hydroxyl protecting group, preferably $C_{1-6}$ alkyl or benzyl;

$R^8$ is selected from an amino or nitro group;

$R^9$ is $C_{1-6}$ alkyl;

X is halogen, preferably chlorine or bromine;

X' is selected from hydrogen or halogen, preferably hydrogen, chlorine, or bromine;

r, q are each independently selected from an integer of 1 to 3.

In one embodiment, $Z^1$ and $Z^2$ are each independently selected from N or $CR^a$; $R^1$ is selected from chlorine, methyl or ethyl; $R^5$ is cyclopentyl; $R^6$ is trifluoromethyl. $R^7$ is methyl or benzyl; $R^8$ is an amino or nitro group; $R^9$ is methyl or ethyl; X is chlorine; X' is hydrogen or bromine; r, q are each independently selected from an integer of 1 to 3.

In one further specific embodiment, $Z^1$ and $Z^2$ are defined as C, and the defined indole derivative is shown in Formula (I'). The preparation method includes the following steps:

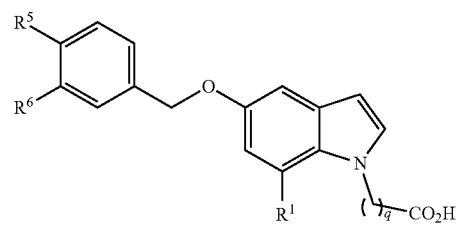

(1) preparing an intermediate 3 by two methods using segments A, B, and C:

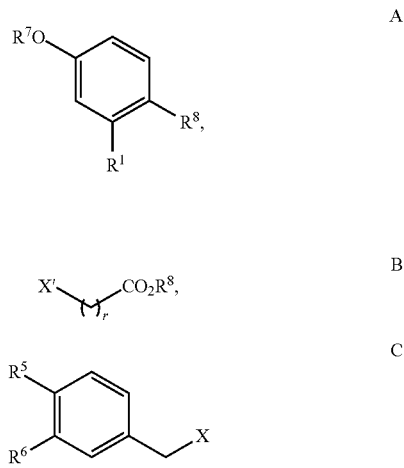

method 1: converting the segment A into an intermediate 1 with indole ring, introducing the segment B into N of the indole ring of the intermediate 1 to obtain an intermediate 2, and subjecting the intermediate 2 to react with the segment C to obtain an intermediate 3:

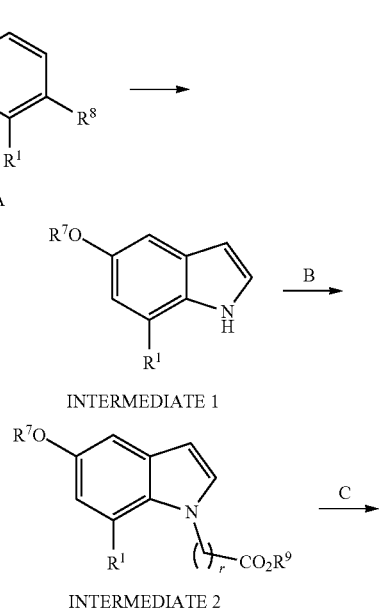

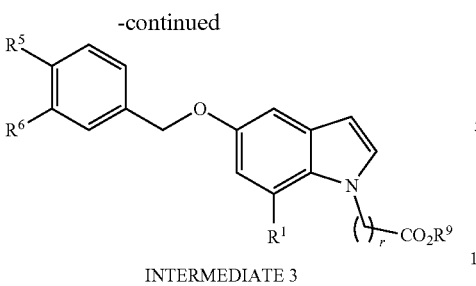

INTERMEDIATE 3 method 2: first subjecting the segment A to react with the segment C to obtain an intermediate 1', further converting the intermediate 1' into an intermediate 2' as indole ring precursor, and introducing the segment B into the intermediate 2' to obtain an intermediate 3:

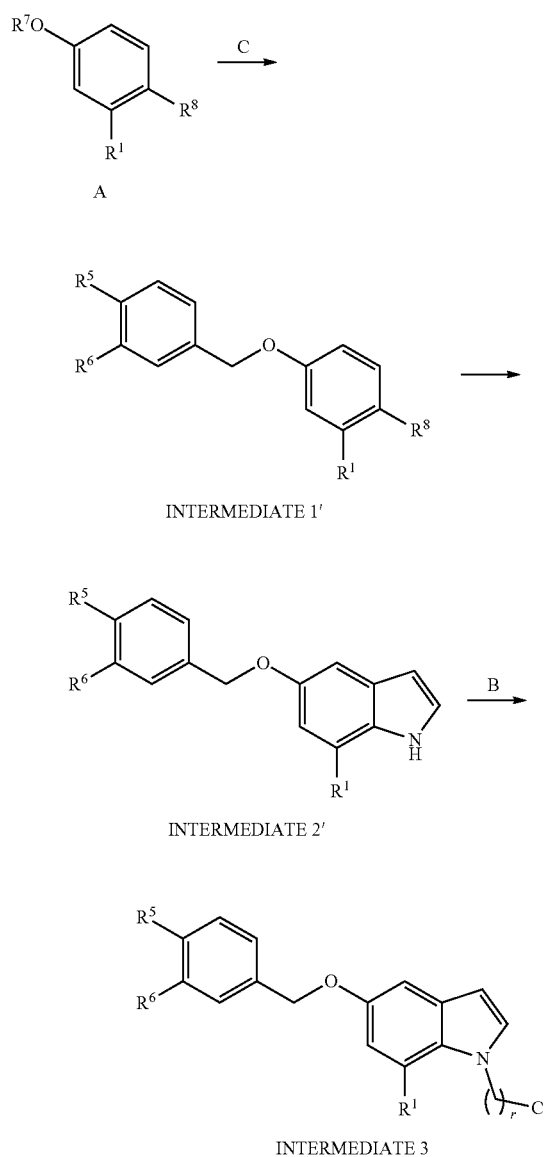

INTERMEDIATE 3

(2) hydrolyzing or reducing the intermediate 3 to hydroxyl, which is then replaced by CN and hydrolyzed to produce a compound of general formula (I):

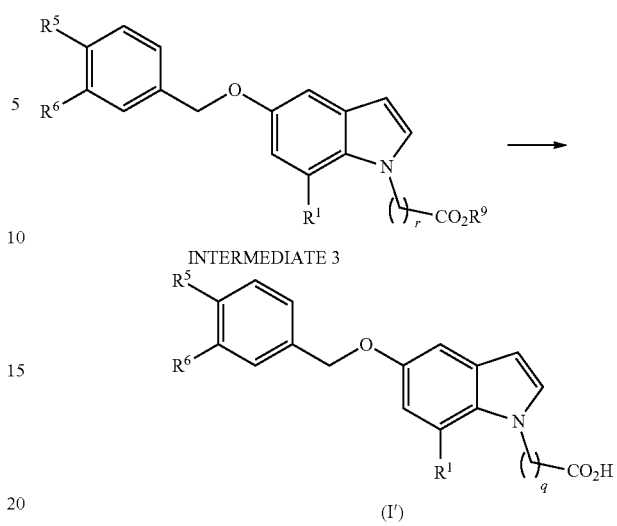

wherein, $R^1$ is selected from hydrogen, halogen, $C_{1-6}$ alkyl, $C_{1-6}$ alkoxy, 3- to 8-membered cycloalkyl or 3- to 8-membered heterocycloalkyl; $R^5$ is selected from 3- to 8-membered cycloalkyl or heterocyclic group; $R^6$ is selected from halogen or halogen-substituted methyl; namely, $R^1$, $R^5$, $R^6$ are as defined in claim 1;

$R^7$ is a hydroxyl protecting group, preferably $C_{1-6}$ alkyl or benzyl;

$R^8$ is amino or nitro group;

$R^9$ is $C_{1-6}$ alkyl;

X is halogen, preferably chlorine or bromine;

X' is selected from hydrogen or halogen, preferably hydrogen, chlorine, or bromine; and r, q are each independently selected from an integer of 1 to 3.

In a specific embodiment, $R^1$ is selected from F, Cl, methyl, ethyl; $R^5$ is selected from cyclopentyl, cyclohexyl; $R^6$ is selected from F, Cl, trifluoromethyl, difluoromethyl, fluoromethyl. That is, $R^1$, $R^5$, $R^6$ are as defined in claim 4; $R^7$ is methyl or benzyl; $R^8$ is an amino or nitro group; $R^9$ is methyl or ethyl; X is chlorine; X' is hydrogen or bromine; r, q are each independently selected from an integer of 1 to 3.

The invention also provides a pharmaceutical composition, which contains the indole derivative described in general formula (I) and its pharmaceutically acceptable carrier.

The invention also relates to the use of the indole derivative described in general formula (I) or the pharmaceutical composition containing an effective amount of indole derivative described in general formula (I) in preparing drugs for treating and/or preventing diseases related to S1P receptor.

Preferably, the disease related to the S1P receptor disorders is selected from Crohn's disease, ulcerative colitis, psoriasis, rheumatoid arthritis, multiple sclerosis, atopic dermatitis, eosinophilic esophagitis, alopecia areata, primary cholangitis, pyoderma gangrenosum, graft-versus-host disease, amyotrophic lateral sclerosis, systemic lupus erythematosus, type I diabetes arteriosclerosis, atherosclerosis, scleroderma, autoimmune hepatitis, acne, microbial infection, and viral infection.

Due to the implementation of the above technical solutions, the invention has the following advantages compared with the prior art:

The compound provided by the invention has novel structure and strong activity, and provides a new method for preventing or treating disease including but not limited to ulcerative colitis and Crohn's disease. The compound of the invention has higher activity and better efficacy compared with the prior art.

BRIEF DESCRIPTION OF DRAWING

The figure shows the general anatomy of the colon of rats in each group after TNBS modeling and continuous administration for 7 days.

DETAILED DESCRIPTION OF PREFERRED EMBODIMENTS

The invention is further described in detail below in combination with specific Examples, but the invention is not limited to the following Examples.

The structure of the compound is determined by nuclear magnetic resonance (NMR) or mass spectrum (MS), and the purity is determined by high pressure liquid chromatography (HPLC). The determination of NMR is performed using Bruker AVANCE-400 nuclear magnetic resonance instrument, the solvent is deuterated dimethyl sulfoxide (DMSO-$d_6$) or deuterated methanol ($CD_3OH$), the internal standard is tetramethylsilane (TMS), and the chemical shift is expressed in ppm. MS is determined by 6120 mass spectrometer from Agilent. HPLC is determined by a 1200DAD high pressure liquid chromatograph from Agilent. Equipment from Waters is used for high pressure liquid preparative chromatography.

Thin-layer chromatography silica gel plate used is HSGF254 silica gel plate from Yantai Huanghai Brand or silica gel plate from Qingdao GF254. The specification of silica gel plate used in thin layer chromatography (TLC) is 0.15 to 0.2 mm, and the specification of thin layer chromatography for separation and purification of product is 0.4 to 0.5 mm.

200 to 300 mesh silica gel from Yantai Huanghai Brand is generally used as the carrier for column chromatography.

Without special description in the Examples, the reactions can be carried out in argon atmosphere or nitrogen atmosphere.

Argon or nitrogen atmosphere means that the reaction bottle is connected with an argon or nitrogen balloon having a volume of about 1 L.

Hydrogen atmosphere means that the reaction bottle is connected with a hydrogen balloon having a volume of about 1 L.

The hydrogenation reaction is usually carried by vacuumizing and filling hydrogen, and such operation is repeated for three times.

Without special description in the Examples, the solution refers to the aqueous solution. Without special description in the Examples, the reaction temperature is room temperature, namely 20° C. to 30° C.

TNBS: 2,4,6-trinitrobenzene sulfonic acid
DMSO: Dimethyl sulfoxide
SASP: Sulfasalazine
Solutol: 15-hydroxystearic acid-polyethylene glycol ester
DSS: Dextran Sulfate Sodium
Saline: Sodium chloride solution
CMC-Na: Sodium carboxymethyl cellulose The raw materials and reagents used in the invention can be prepared by conventional methods or commercially available unless otherwise specified.

EXAMPLE 1

3-(5-(4-cyclopentyl-3-(trifluoromethyl)benzyl)oxy)-7-methyl-1H-indole-1-yl)propionic acid (1)

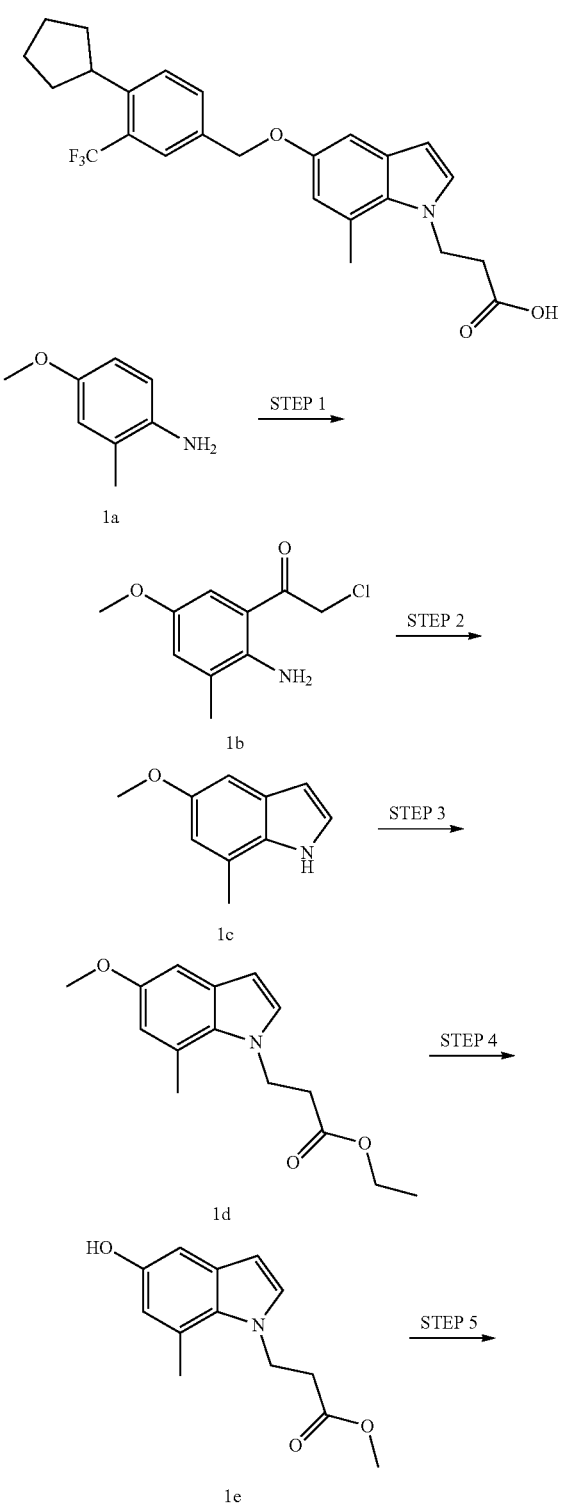

-continued

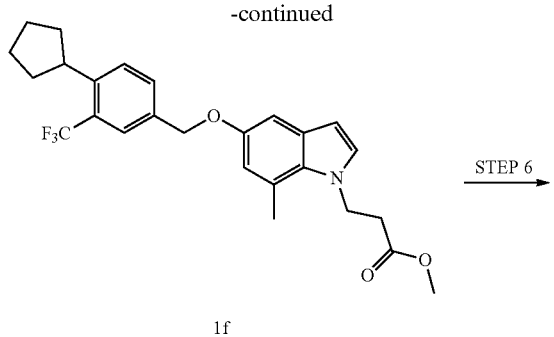

1f

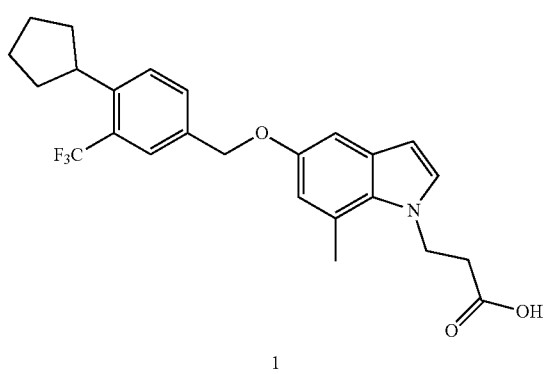

1

Step 1: 1-(2-amino-5-methoxy-3-methylphenyl)-2-chloroacetone (1b)

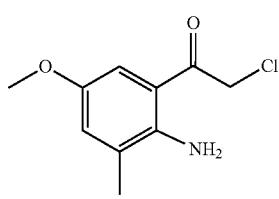

1b 2-methyl-4-methoxyaniline (1a) (5.0 g, 36.4 mmol) was dissolved in toluene (20 mL), and to this was added boron trichloride (37 mL, 1 M dichloromethane solution), titanium tetrachloride (37 mL, 1 M dichloromethane solution), and chloroacetonitrile (3.1 g, 41 mmol) successively at −78° C. The reaction solution was heated to 90° C. and stirred for 3 h. 2 M hydrochloric acid aqueous solution (30 mL) was added into the reaction system, and stirred at 85° C. for 45 min. Saturated sodium bicarbonate solution (100 mL) was added to the reaction system, and the system was extracted with dichloromethane (100 mL×3) to give an organic phase. The organic phase was dried over anhydrous sodium sulfate, filtered to obtain the filtrate which was then concentrated under reduced pressure. The obtained residue was purified by silica gel column chromatography (ethyl acetate:petroleum ether (v/v)=1:5) to obtain a yellow solid 1-(2-amino-5-methoxy-3-methylphenyl)-2-chloroethanone (1b) (4.30 g, yield: 55.2%).

MS (ESI) m/z: 214 [M+1].

Step 2: 5-methoxy-7-methyl-1H-indole (1c)

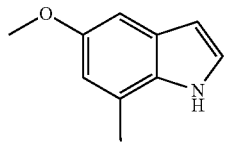

1c 1-(2-amino-5-methoxy-3-methylphenyl)-2-chloroethanone (1b) (4.3 g, 20.1 mmol) was dissolved in 1,4-dioxane (20 mL) and water (2 mL), and then to this was added sodium borohydride (844 mg, 22.3 mmol). The reaction system was heated to 120° C. and stirred for 1 h. The reaction solution was concentrated under reduced pressure. Water (20 mL) was added into the obtained residue and then was extracted with ethyl acetate (40 mL×3) to give an organic phase. The organic phase was dried over anhydrous sodium sulfate, filtered to obtain the filtrate which was then concentrated under reduced pressure. The residue was purified by silica gel column chromatography (ethyl acetate: petroleum ether (v/v)×1:5) to obtain a white solid 5-methoxy-7-methyl-1H-indole (1c) (3.0 g, yield: 92.5%).

$^1$H NMR (400 MHz, CDCl$_3$) δ8.06-7.75 (s, 1H), 7.07 (t, J=2.8 Hz, 1H), 6.95 (d, J=2.1 Hz, 1H), 6.68 (d, J=1.4 Hz, 1H), 6.46 (dd, J=2.9, 2.1 Hz, 1H), 3.81 (s, 3H), 2.38 (s, 3H).

MS (ESI) m/z: 162 [M−1].

Step 3: 3-(5-methoxy-7-methyl-1H-indole-1-yl)ethyl propionate (1d)

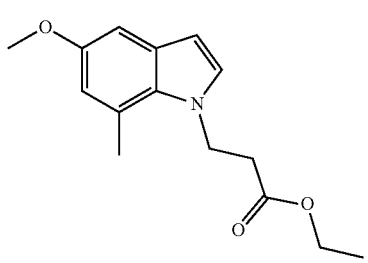

1d

Into a reaction bottle, were added acetonitrile (5 mL), 5-methoxy-7-methyl-1H-indole (1c) (1.0 g, 6.2 mmol), ethyl acrylate (2.5 g, 24.8 mmol) and 1,8-diazabicyclo [5.4.0]-7-undecene (1.9 g, 12.4 mmol) successively. The reaction solution was heated to 50° C. and stirred for 2h. The reaction solution was concentrated under reduced pressure to obtain the residue which was then diluted with water (10 mL) and extracted with ethyl acetate (20 mL×3) to give an organic phase. The organic phase was dried over anhydrous sodium sulfate, filtered to obtain the filtrate which was then concentrated under reduced pressure. The residue was purified by silica gel column chromatography (ethyl acetate:petroleum ether (v/v)=1:5) to obtain a yellow solid 3-(5-methoxy-7-methyl-1H-indole-1-yl)ethyl propionate (1d) (1.4 g, yield: 86.4%).

MS (ESI) m/z: 262 [M+1].

Step 4: 3-(5-hydroxyl-7-methyl-1H-indole-1-yl) methyl propionate (1e)

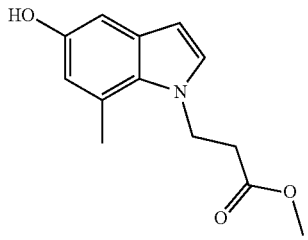

1e 3-(5-methoxy-7-methyl-1H-indole-1-yl)ethyl propionate 1d (1.3 g, 5.0 mmol) was dissolved in dichloromethane (10 mL), and boron tribromide (5 mL, 33% dichloromethane solution) was added at −78° C. The reaction solution was heated to room temperature and stirred for 16 h. Methanol (5 mL) was added into the reaction solution and then concentrated under reduced pressure. The residue was diluted with water (10 mL) and extracted with ethyl acetate (20 mL×3) to give an organic phase. The organic phase was dried over anhydrous sodium sulfate, filtered to obtain the filtrate which was then concentrated under reduced pressure. The residue was purified by silica gel column chromatography (ethyl acetate:petroleum ether (v/v)=3:5) to obtain a yellow oil 3-(5-hydroxyl-7-methyl-1H-indole-1-yl)methyl propionate 1e (100 mg, yield: 8.6%).

MS (ESI) m/z: 234 [M+1].

Step 5: 3-(5-((4-cyclopentyl-3-(trifluoromethyl)benzyl)oxy)-7-methyl-1H-indole-1-yl)methyl propionate (1f)

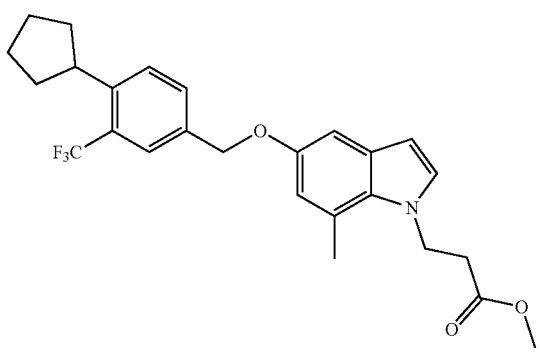

1f

Into the solution of 3-(5-hydroxyl-7-methyl-1H-indole-1-yl)methyl propionate 1e (100 mg, 0.43 mmol) in N,N-dimethylformamide (5 mL), were added 4-(chloromethyl)-1-cyclopentyl-2-(trifluoromethyl)benzene (225 mg, 0.86 mmol) and cesium carbonate (421 mg, 1.29 mmol). The reaction solution was heated to 50° C. and stirred for 2 h. And then the reaction solution was diluted with water (10 mL) and extracted with ethyl acetate (20 mL×3) to give an organic phase. The organic phase was dried over anhydrous sodium sulfate, filtered to obtain the filtrate which was then concentrated under reduced pressure. The residue was purified by silica gel column chromatography (ethyl acetate:petroleum ether (v/v)=1:5) to obtain an colorless oil 3-(5-((4-cyclopentyl-3-(trifluoromethyl)benzyl)oxy)-7-methyl-1H-indole-1-yl)methyl propionate 1f (150 mg, yield: 76.1%).

MS (ESI) m/z: 460 [M+1].

Step 6: 3-(5-((4-cyclopentyl-3-(trifluoromethyl)benzyl)oxy)-7-methyl-1H-indole-1-yl)propionic acid (1)

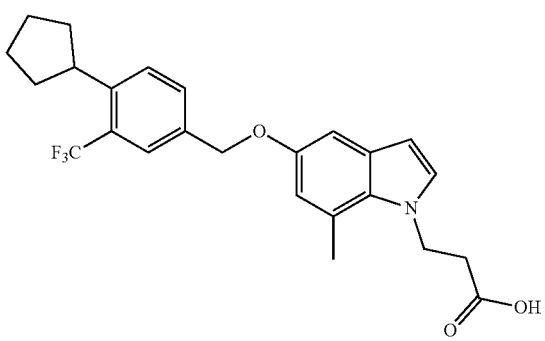

1

3-(5-((4-cyclopentyl-3-(trifluoromethyl)benzyl)oxy)-7-methyl-1H-indole-1-yl)methyl propionate 1f (150 mg, 0.33 mmol) was dissolved in a mixture of methanol (5 mL) and water (1 mL), and lithium hydroxide monohydrate (55 mg, 1.31 mmol) was added. The reaction solution was heated to 50° C. and stirred for 4 h. And then the reaction solution was adjusted to pH 6 with 10% hydrochloric acid aqueous solution. The reaction solution was concentrated under reduced pressure, and the obtained residue was prepared by high pressure liquid chromatography (acetonitrile/water (containing 0.1% formic acid, gradient elution) to obtain a white solid 3-(5-((4-cyclopentyl-3-(trifluoromethyl)benzyl)oxy)-7-methyl-1H-indole-1-yl)propionic acid (1) (50.5 mg, yield: 34.7%).

$^1$H NMR(400 MHz, CD$_3$OD) δ12.42 (s, 1H), 7.70 (d, J=10.0 Hz, 2H), 7.63 (d, J=8.0 Hz, 1H), 7.22 (d, J=3.1 Hz, 1H), 6.94 (d, J=2.4 Hz, 1H), 6.63 (d, J=1.9 Hz, 1H), 6.28 (d, J=3.1 Hz, 1H), 5.11 (s, 2H), 4.52 (t, J=7.1 Hz, 2H), 3.27-3.22 (m, 1H), 2.68 (t, J=7.1 Hz, 2H), 2.63 (s, 3H), 2.00 (m, 2H), 1.84 (m, 2H), 1.72-1.55 (m, 4H).

MS (ESI) m/z: 446 [M+1].

EXAMPLE 2

3-(5-((4-cyclopentyl-3-(trifluoromethyl)benzyl)oxy)-7-ethyl-1H-indole-1-yl)propionic acid (2)

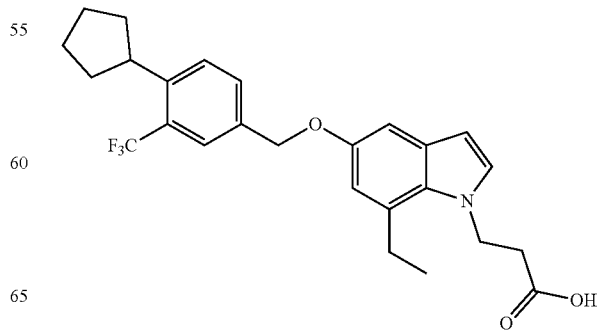

2

-continued

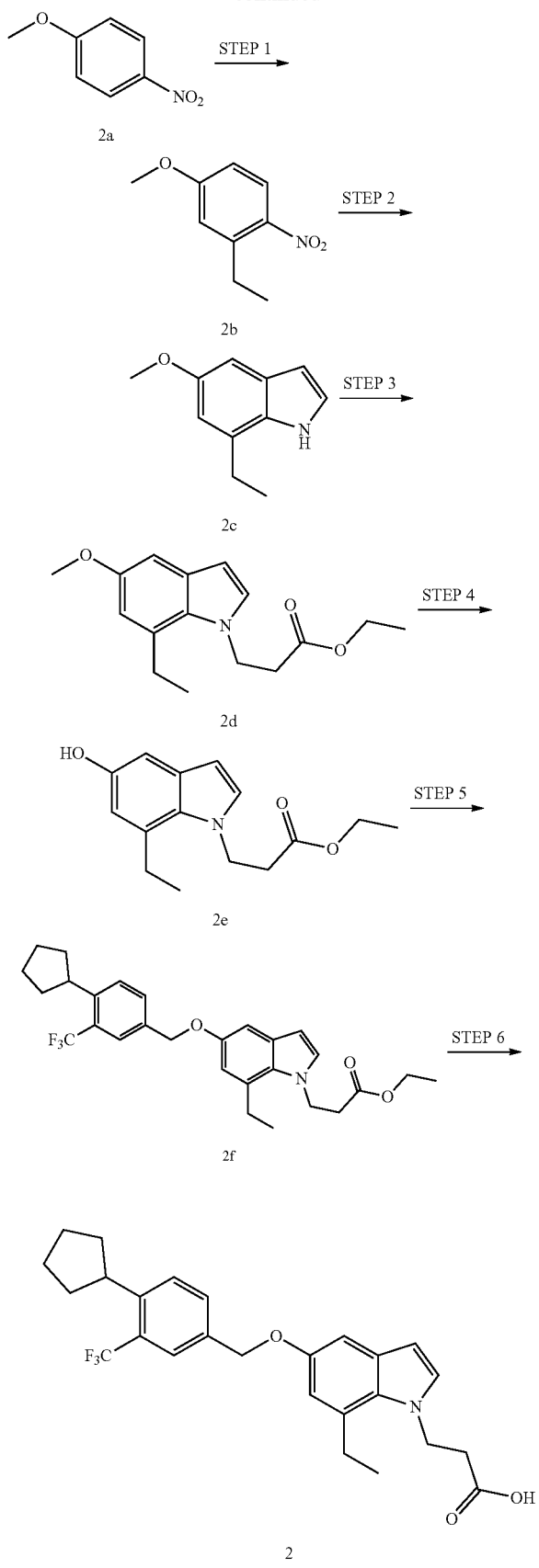

Step 1: 2-ethyl-4-methoxy-1-nitrobenzene (2b)

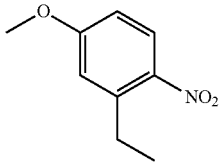

1 M vinyl magnesium bromide solution (75.10 mL) was added into a solution of 1-methoxy-4-nitrobenzene 2a (5 g, 32.65 mmol) in tetrahydrofuran (100 mL) at −15° C. The reaction solution was stirred at −15° C. for 2 h. 2,3-dichloro-5,6-dicyano-1,4-benzoquinone (12.60 g, 55.51 mmol) was added to the reaction solution, which was then was stirred at −40° C. for 3 h. Saturated ammonium chloride aqueous solution (50 mL) was added to the reaction solution, which was extracted with ethyl acetate (100 mL×3) to give an organic phase. The organic phase was dried over anhydrous sodium sulfate, filtered to obtain the filtrate which was then concentrated under reduced pressure. The residue was purified by silica gel column chromatography (ethyl acetate:petroleum ether (v/v)=1:5) to obtain a dark yellow oil 2-ethyl-4-methoxy-1-nitrobenzene 2b (2.55 g, yield: 43.10%).

MS (ESI) m/z: 182 [M+1].

Step 2: 7-ethyl-5-methoxy-1H-indole (2c)

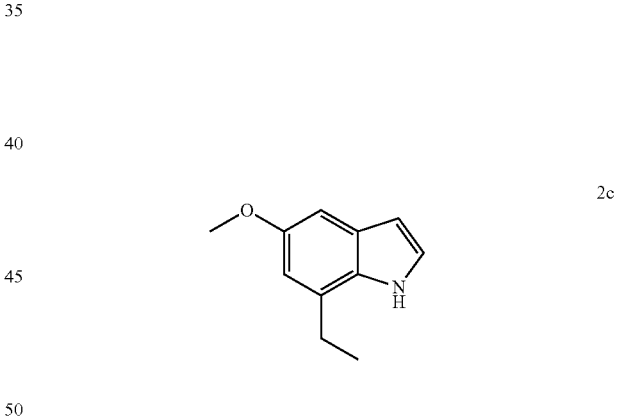

A solution of 2-ethyl-4-methoxy-1-nitrobenzene (2b) (1 g, 5.52 mmol) dissolved in tetrahydrofuran (10 mL) was cooled to −40° C., and 1 M vinyl magnesium bromide solution (16.56 mL) was added. The reaction solution was stirred at −40° C. for 4 h. And then water (50 mL) was added and the reaction solution was extracted with ethyl acetate (100 mL×3) to give an organic phase. The organic phase was dried over anhydrous sodium sulfate, filtered to obtain the filtrate which was then concentrated under reduced pressure. The residue was purified by silica gel column chromatography (ethyl acetate:petroleum ether (v/v)=1:5) to obtain a dark yellow oil 7-ethyl-5-methoxy-1H-indole (2c) (200 mg, yield: 20.7%).

MS (ESI) m/z: 176 [M+1].

Step 3: 3-(7-ethyl-5-methoxy-1H-indole-1-yl)ethyl propionate (2d)

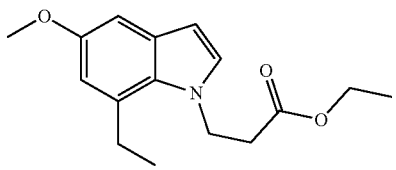

2d

Into a reaction bottle, were added acetonitrile (3 mL), 7-ethyl-5-methoxy-1H-indole (2c) (200 mg, 1.14 mmol), ethyl acrylate (571.35 mg, 5.71 mmol) and 1,8-diazabicyclo[5.4.0]-7-undecene (347.53 mg, 2.28 mmol) successively. The reaction solution was heated to 60° C. and stirred for 16 h. The reaction solution was concentrated under reduced pressure to obtain a residue, which was then diluted with water (5 mL), and extracted with ethyl acetate (10 mL×3) to give an organic phase. The organic phase was dried over anhydrous sodium sulfate, filtered to obtain the filtrate which was then concentrated under reduced pressure. The residue was purified by silica gel column chromatography (ethyl acetate:petroleum ether (v/v)=1:5) to obtain a brown oil 3-(7-ethyl-5-methoxy-1H-indole-1-yl)ethyl propionate (2d) (260 mg, yield: 82.7%).

MS (ESI) m/z: 276 [M+1].

Step 4: 3-(7-ethyl-5-hydroxyl-1H-indole-1-yl)ethyl propionate (2e)

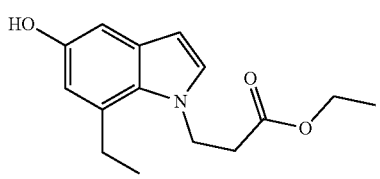

2e 3-(7-ethyl-5-methoxy-1H-indole-1-yl) ethyl propionate (2d) (100 mg, 0.36 mmol) was added into boron tribromide solution (5 mL, 33% dichloromethane solution) at −78° C., and was stirred at room temperature for 1 h. Methanol (5 mL) was added to the resulting solution, which was adjusted to pH 7 with saturated sodium bicarbonate solution. Then water (20 mL) was added to the resulting solution, which was extracted with ethyl acetate (40 mL×3) to give an organic phase. The organic phase was dried over anhydrous sodium sulfate, filtered to obtain the filtrate which was then concentrated under reduced pressure. The residue was purified by silica gel column chromatography (ethyl acetate:petroleum ether (v/v)=2:5) to obtain a pale yellow oil 3-(7-ethyl-5-hydroxyl-1H-indole-1-yl)ethyl propionate (2e) (90 mg, yield: 94.8%).

MS (ESI) m/z: 262 [M+1].

Step 5: 3-[5-[[4-cyclopentyl-3-(trifluoromethyl)benzyl]oxy]-7-ethyl-1H-indole-1-yl]ethyl propionate (2f)

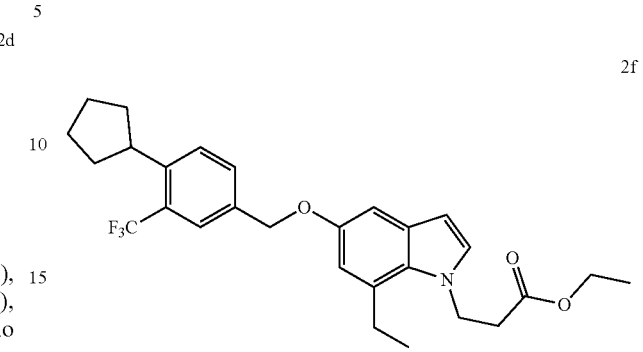

2f 4-(chloromethyl)-1-cyclopentyl-2-(trifluoromethyl)benzene(80.42 mg, 0.31 mmol) and cesium carbonate (199.49 mg, 0.61 mmol) were added into a solution of 3-(7-ethyl-5-hydroxyl-1H-indole-1-yl) ethyl propionate (2e) (80 mg, 0.31 mmol) dissolved in N,N-dimethylformamide (2 mL). The resulting solution was heated to 60° C. and stirred for 2 h. The reaction solution was diluted with water (5 mL), and extracted with ethyl acetate (10 mL×3) to give an organic phase. The organic phase was dried over anhydrous sodium sulfate, filtered to obtain the filtrate which was then concentrated under reduced pressure. The residue was purified by silica gel column chromatography (ethyl acetate:petroleum ether (v/v)=1:5) to obtain a brown oil 3-[5-[[4-cyclopentyl-3-(trifluoromethyl)benzyl]oxy]-7-ethyl-1H-indole-1-yl]ethyl propionate (2f) (50 mg, yield: 33.5%).

MS (ESI) m/z: 488 [M+1].

Step 6: 3-(54(4-cyclopentyl-3-(trifluoromethyl)benzyl)oxy)-7-ethyl-1H-indole-1-yl)propionic acid (2)

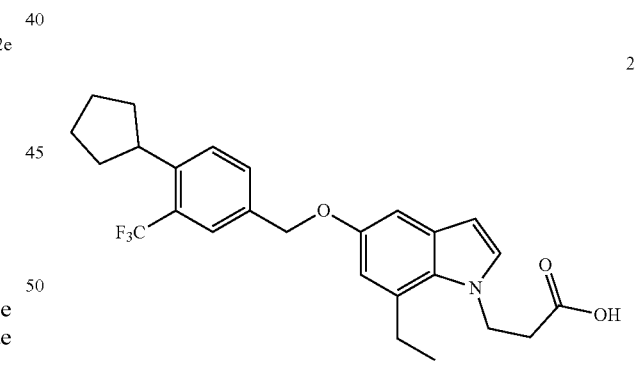

2

The compound 3-(5-((4-cyclopentyl-3-(trifluoromethyl)oxy)-7-ethyl-1H-indole-1-yl)protonic acid (2) was synthesized with 3-[5-[[4-cyclopentyl-3-(trifluoromethyl)benzyl]oxy]-7-ethyl-1H-indole-1-yl]ethyl propionate(2f) as raw material by the synthesis method described in step 6 of Example 1.

$^1$H NMR(400 MHz, CDCl$_3$) δ7.70 (s, 1H), 7.59 (d, J=8.0 Hz, 1H), 7.48 (d, J=8.1 Hz, 1H), 7.04 (d, J=2.9 Hz, 1H), 6.98 (d, J=1.8 Hz, 1H), 6.77 (s, 1H), 6.41 (d, J=2.9 Hz, 1H), 5.06 (s, 2H), 4.58 (t, J=7.1 Hz, 2H), 3.43-3.31 (m, 1H), 2.98 (q, J=7.4 Hz, 2H), 2.81 (t, J=7.0 Hz, 2H), 2.08 (m, 2H), 1.86 (m, 2H), 1.73 (m, 2H), 1.60 (m, 2H), 1.36 (t, J=7.4 Hz, 3H).

M (ESI) m/z: 460 [M+1].

EXAMPLE 3

3-(7-chlorine-5-((4-cyclopentyl-3-(trifluoromethyl)benzyl)oxy)-1H-indole-1-yl)propionic acid (3)

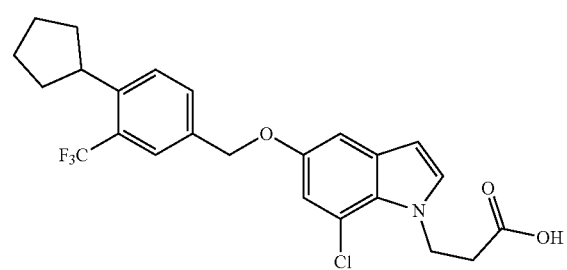

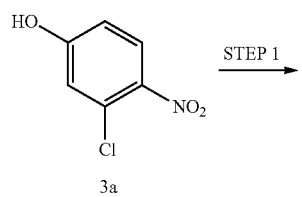

3a

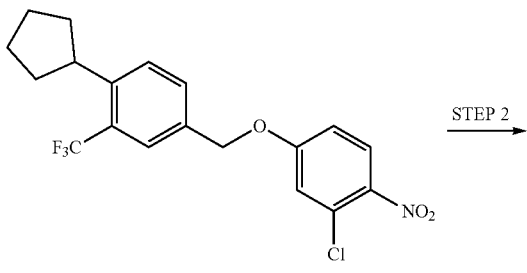

3b

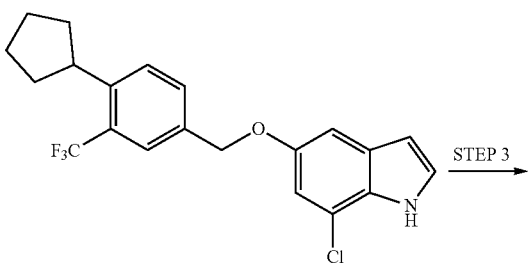

3c

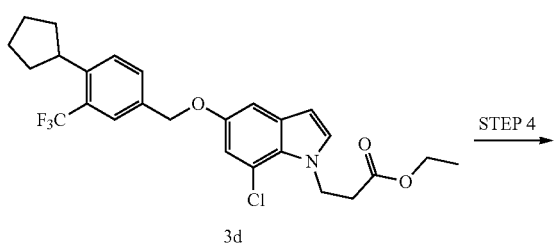

3d

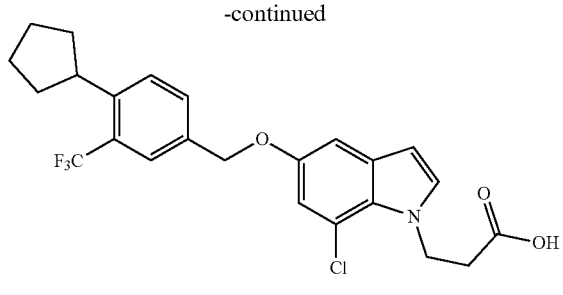

3

Step 1: 2-chlorine-4-((4-cyclopentyl-3-(trifluoromethyl)benzyl)oxy)-1-nitrobenzene (3b)

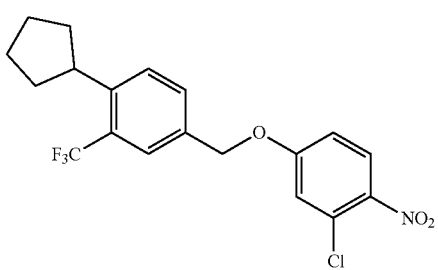

3b 4-(chloromethyl)-1-cyclopentyl-2-(trifluoromethyl)benzene (1.51 g, 5.76 mmol) and cesium carbonate (3.75 g, 11.52 mmol) were added into a solution of 3-chlorine-4-nitrophenol (3a) (1 g, 5.76 mmol) in N,N-dimethylformamide (10 mL). The reaction was performed at 80° C. for 3 h. The reaction solution was diluted with water (20 mL), and extracted with ethyl acetate (30 mL×3) to give an organic phase. The organic phase was dried over anhydrous sodium sulfate, filtered to obtain the filtrate which was then concentrated under reduced pressure. The residue was purified by silica gel column chromatography (ethyl acetate:petroleum ether (v/v)=1:20) to obtain a brown oil 2-chlorine-4-((4-cyclopentyl-3-(trifluoromethyl)benzyl)oxy)-1-nitrobenzene (3b) (2.1 g, yield: 91.2%).

MS (ESI) m/z: 400 [M+1].

Step 2: 7-chlorine-5-((4-cyclopentyl-3-(trifluoromethyl)benzyl)oxy)-1H-indole (3c)

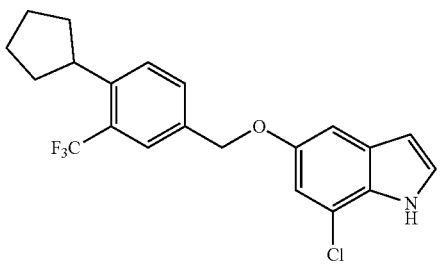

3c

Into a reaction bottle, were added 2-chlorine-4-((4-cyclopentyl-3-(trifluoromethyl)benzyl)oxy)-1-nitrobenzene (3b)

(2.1 g, 5.25 mmol) and tetrahydrofuran (20 mL), and then 1 M vinyl magnesium bromide solution (15.76 mL) at −40° C. The reaction solution was stirred at −40° C. for 6 h. Saturated ammonium chloride (20 mL) was added to the reaction solution, which was extracted with ethyl acetate (40 mL×3) to give an organic phase. The organic phase was dried over anhydrous sodium sulfate, filtered to obtain the filtrate which was then concentrated under reduced pressure. The residue was purified by silica gel column chromatography (ethyl acetate:petroleum ether (v/v)=1:20) to obtain a brown oil 7-chlorine-5-((4-cyclopentyl-3-(trifluoromethyl)benzyl)oxy)-1H-indole (3c) (900 mg, yield: 43.5%).

MS (ESI) m/z: 394 [M+1].

Step 3: 3-(7-chlorine-5-((4-cyclopentyl-3-(trifluoromethyl)benzyl)oxy)-1H-indole-1-yl) ethyl propionate (3d)

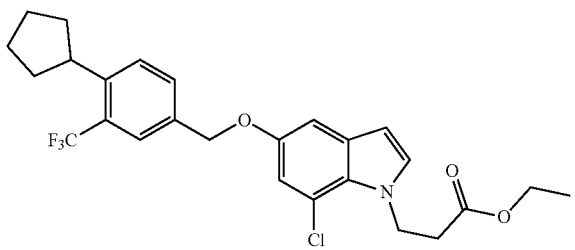

3d

Into a reaction bottle, were added acetonitrile (50 mL), 7-chlorine-5-((4-cyclopentyl-3-(trifluoromethyl)benzyl)oxy)-1H-indole (3c) (900 mg, 2.29 mmol), ethyl acrylate (1.14 g, 11.43 mmol), and 1,8-diazabicyclo[5.4.0]-7-undecene (1.9 g, 12.4 mmol), successively. The reaction solution was heated to 60° C. and stirred for 16 h. The reaction solution was concentrated under reduced pressure to obtain the residue which was then diluted with water (20 mL) and extracted with ethyl acetate (40 mL×3) to give an organic phase. The organic phase was dried over anhydrous sodium sulfate, filtered to obtain the filtrate which was then concentrated under reduced pressure. The residue was purified by silica gel column chromatography (ethyl acetate:petroleum ether (v/v)=1:10) to obtain a yellow oil 3-(7-chlorine-5-((4-cyclopentyl-3-(trifluoromethyl)benzyl)oxy)-1H-indole-1-yl)ethyl propionate (3d) (1.1 g, yield: 97.4%).

MS (ESI) m/z: 494 [M+1].

Step 4: 3-(7-chlorine-5-((4-cyclopentyl-3-(trifluoromethyl)benzyl)oxy)-1H-indole-1-yl)propionic acid (3)

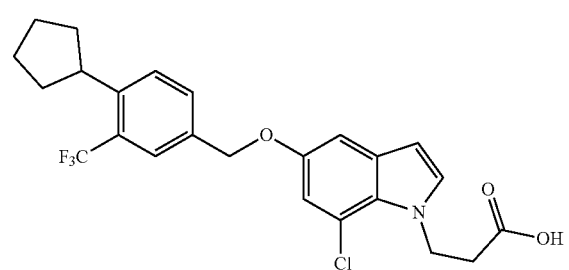

3

The compound 3-(7-chlorine-5-((4-cyclopentyl-3-(trifluoromethyl)benzyl)oxy)-1H-indole-1-yl) propionic acid (3) was synthesized with 3-(7-chlorine-5-((4-cyclopentyl-3-(trifluoromethyl)benzyl)oxy)-1H-indole-1-yl) ethyl propionate (3d) as raw material by the synthesis method described in step 6 of Example 1.

1H NMR(400 MHz, DMSO-d$_6$) δ12.42 (s, 1H), 7.71 (d, J=11.1 Hz, 2H), 7.64 (d, J=8.1 Hz, 1H), 7.35 (d, J=3.1 Hz, 1H), 7.15 (d, J=2.3 Hz, 1H), 6.94 (d, J=2.2 Hz, 1H), 6.40 (d, J=3.1 Hz, 1H), 5.16 (s, 2H), 4.65 (t, J=7.1 Hz, 2H), 3.29-3.20 (m, 1H), 2.74 (t, J=7.1 Hz, 2H), 2.05-1.95 (m, 2H), 1.90-1.77 (m, 2H), 1.64 (m, 4H).

MS (ESI) m/z: 466 [M+1].

EXAMPLE 4

4-(5-((4-cyclopentyl-3-(trifluoromethyl)benzyl)oxy)-7-methyl-1H-indole-1-yl)butyric acid(4)

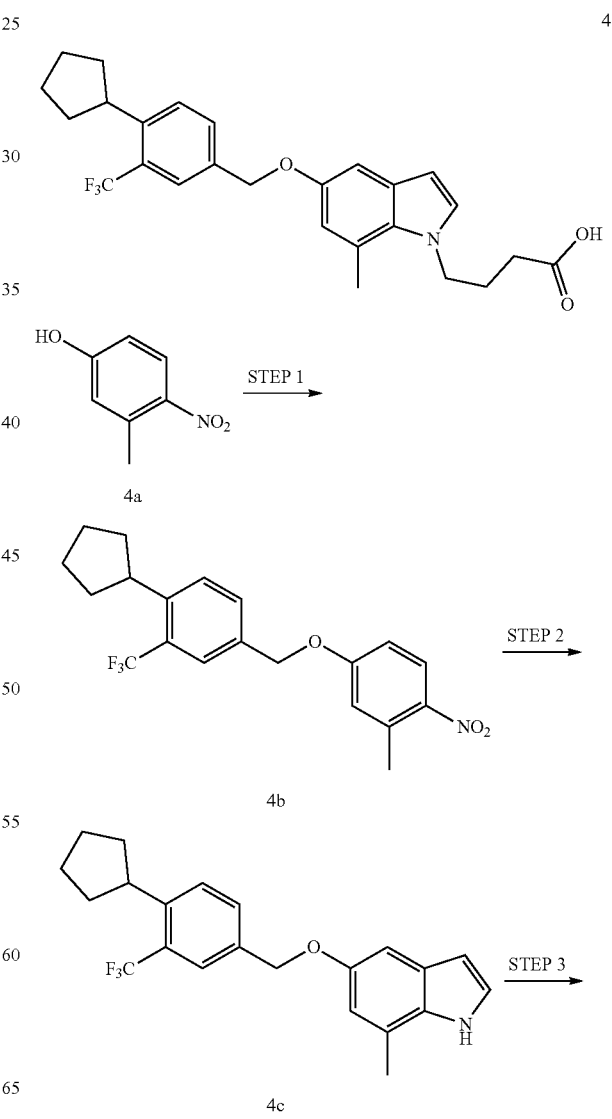

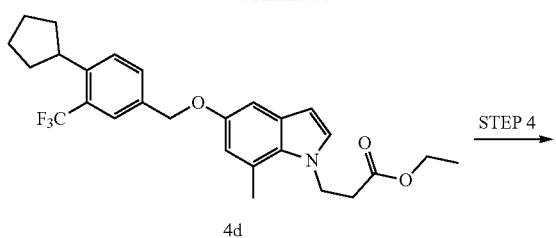

4d

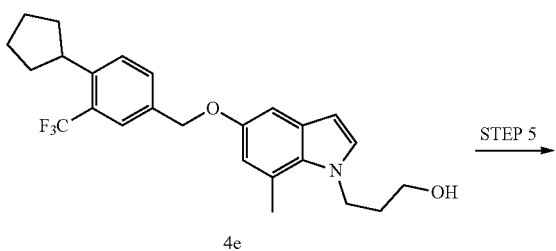

4e

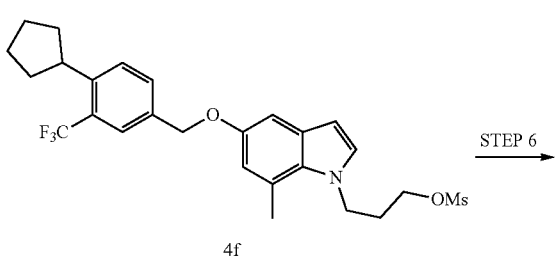

4f

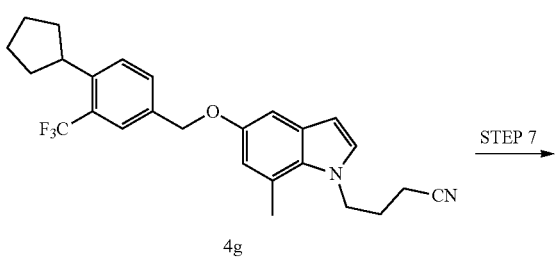

4g

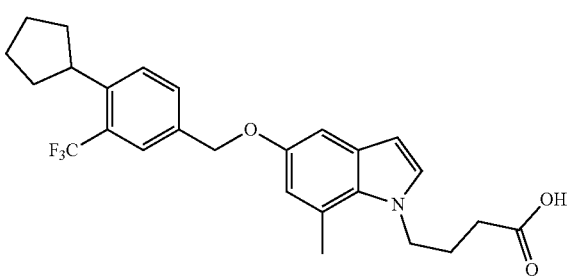

4

Step 1: 1-cyclopentyl-4-[(3-methyl-4-nitro-phenolyl)methyl]-2-(trifluoromethyl)benzene (4b)

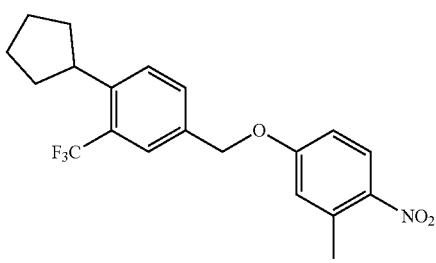

4-(chloromethyl)-1-cyclopentyl-2-(trifluoromethyl)benzene (2.06 g, 7.84 mmol) and cesium carbonate (5.11 g, 15.67 mmol) were added into a solution of 3-methyl-4-nitrophenol (4a) (1.2 g, 7.84 mmol) in N,N-dimethylformamide (10 mL). The resulting solution was heated to 80° C. and stirred for 2 h. The reaction solution was diluted with water (10 mL), and extracted with ethyl acetate (30 mL×3) to give an organic phase. The organic phase was dried over anhydrous sodium sulfate, filtered, and the filtrate was then concentrated under reduced pressure to obtain a pale yellow solid 1-cyclopentyl-4-[(3-methyl-4-nitro-phenolyl)methyl]-2-(trifluoromethyl)benzene (4b) (2.9 g, yield: 97.5%).

MS (ESI) m/z: 380 [M+1].

Step 2: 5-[[4-cyclopentyl-3-(trifluoromethyl)benzyl]oxy]-7-methyl-1H-indole (4c)

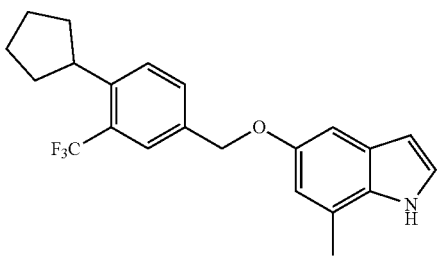

1 M vinyl magnesium bromide solution (7.91 mL) was added into a solution of 1-cyclopentyl-4-[(3-methyl-4-nitro-phenolyl)methyl]-2-(trifluoromethyl)benzene (4b) (500 mg, 1.32 mmol) in tetrahydrofunan (5 mL) at −40° C. The reaction solution was stirred at −40° C. for 1 h. And saturated ammonium chloride solution (30 mL) was added, and the reaction solution was extracted with ethyl acetate (60 mL×3) to give an organic phase. The organic phase was dried over anhydrous sodium sulfate, filtered, and the filtrate was then concentrated under reduced pressure. The residue was purified by silica gel column chromatography (ethyl acetate:petroleum ether (v/v)=1:20) to obtain a yellow oil 5-[[4-cyclopentyl-3-(trifluoromethyl)benzyl]oxy]-7-methyl-1H-indole (4c) (160 mg, yield: 32.5%).

MS (ESI) m/z: 374 [M+1].

Step 3: 3-(5-((4-cyclopentyl-3-(trifluoromethyl)benzyl)oxy)-7-methyl-1H-indole-1-yl) ethyl propionate (4d)

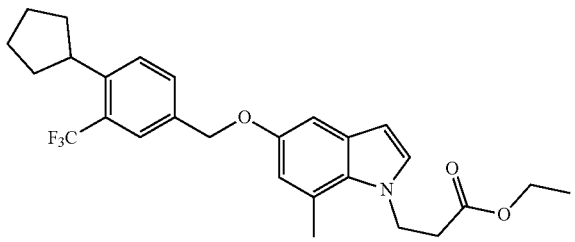

Into a reaction bottle, were added acetonitrile (5 mL), 5-[[4-cyclopentyl-3-(trifluoromethyl)benzyl]oxy]-7-methyl-1H-indole (4c) (520 mg, 1.39 mmol), ethyl acrylate (697.09 mg, 6.96 mmol), and 1,8-diazabicyclo[5.4.0]-7-undecene (424.00 mg, 2.79 mmol) successively. The reaction solution was heated to 60° C. and stirred for 16 h. The reaction solution was concentrated under reduced pressure to obtain a residue which was then diluted with water (5 mL) and extracted with ethyl acetate (10 mL×3) to give an organic phase. The organic phase was dried over anhydrous sodium sulfate, filtered to obtain the filtrate which was concentrated under reduced pressure. The residue was purified by silica gel column chromatography (ethyl acetate: petroleum ether (v/v)=1:5) to obtain a pale yellow oil 3-(5-(4-cyclopentyl-3-(trifluoromethyl)benzyl)oxy)-7-methyl-1H-indole-1-yl) ethyl propionate (4d) (420 mg, yield: 63.7%).

MS (ESI) m/z: 474 [M+1].

Step 4: 3-(5-((4-cyclopentyl-3-(trifluoromethyl)benzyl)oxy)-7-methyl-1H-indole-1-yl)propane-1-ol (4e)

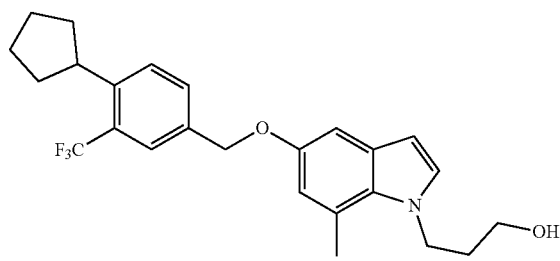

Diisobutylaluminium hydride solution (1.5 M, 1.18 mL) was added into a solution of 3-(5-((4-cyclopentyl-3-(trifluoromethyl)benzyl)oxy)-7-methyl-1H-indole-1-yl) ethyl propionate (4d) (420 mg, 0.89 mmol) dissolved in tetrahydrofuran (5 mL) at 0° C. The reaction was performed for 1 h. And then sodium sulfate decahydrate was added to the resulting solution, which was then filtered. The obtained filtrate was concentrated under reduced pressure, and purified by silica gel column chromatography (ethyl acetate: petroleum ether (v/v)=1:5) to obtain the target product 3-(5-((4-cyclopentyl-3-(trifluoromethyl)benzyl)oxy)-7-methyl-1H-indole-1-yl)propane-1-ol (4e) (350 mg, yield: 91.4%).

MS (ESI) m/z: 432 [M+1].

Step 5: 3-(5-((4-cyclopentyl-3-(trifluoromethyl)benzyl)oxy)-7-methyl-1H-indole-1-yl)propyl methanesulfonate (4f)

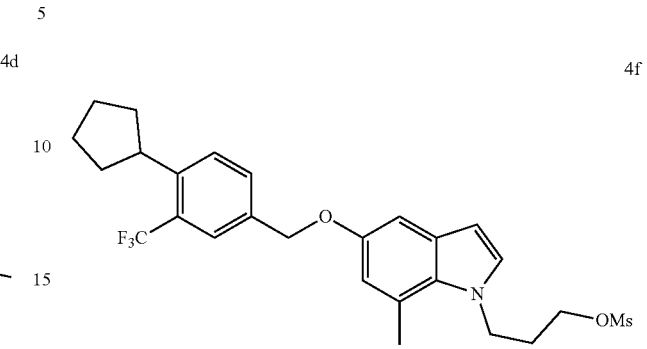

3-(5-(4-cyclopentyl-3-(trifluoromethyl)benzyl)oxy)-7-methyl-1H-indole-1-yl)propane-1-ol (4e) (350 mg, 0.81 mmol) and triethylamine (164.16 mg, 1.62 mmol, 0.23 mL) were dissolved in dichloromethane (5 mL). Methylsulfonyl chloride (185.83 mg, 1.62 mmol) was added to the resulting solution at 0° C., which was stirred at room temperature for 1 h. Water (5 mL) was added to the reaction solution, which was then extracted with ethyl acetate (10 mL×3) to give an organic phase. The organic phase was dried over anhydrous sodium sulfate, filtered to obtain the filtrate which was then concentrated under reduced pressure. The obtained residue was a pale yellow solid 3-(5-((4-cyclopentyl-3-(trifluoromethyl)benzyl)oxy)-7-methyl-1H-indole-1-yl)propyl methanesulfonate (4f) (240 mg, yield: 58.1%).

MS (ESI) m/z: 510 [M+1].

Step 6: 4-(5-((4-cyclopentyl-3-(trifluoromethyl)benzyl)oxy)-7-methyl-1H-indole-1-yl)butyronitrile (4g)

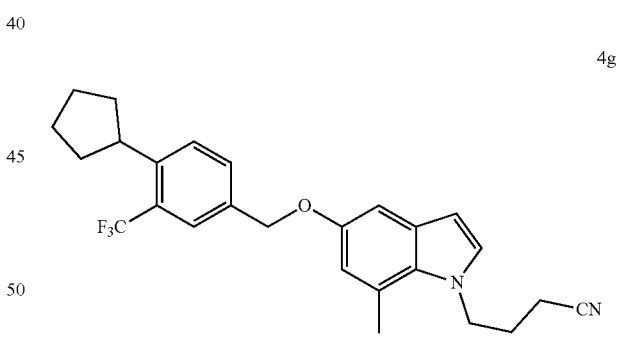

Sodium cyanide (115.41 mg, 2.35 mmol) was added into a solution of 3-(5-((4-cyclopentyl-3-(trifluoromethyl)benzyl)oxy)-7-methyl-1H-indole-1-yl)propyl methanesulfonate (4f) (240 mg, 0.47 mmol) dissolved in N,N-dimethylformamide (5 mL). The reaction solution was heated to 90° C. and stirred for 16 h. Water (5 mL) was added to the reaction solution, which was extracted with ethyl acetate (10 mL) to give an organic phase. The organic phase was dried over anhydrous sodium sulfate, filtered to obtain the filtrate which was then concentrated under reduced pressure. The obtained residue was a white solid 4-(5-((4-cyclopentyl-3-(trifluoromethyl)benzyl)oxy)-7-methyl-1H-indole-1-yl)butyronitrile (4g) (190 mg, yield: 91.6%).

MS(ESI) m/z: 441 [M+1].

Step 7: 4-(5-((4-cyclopentyl-3-(trifluoromethyl)benzyl)oxy)-7-methyl-1H-indol-1-yl)butyric acid (4)

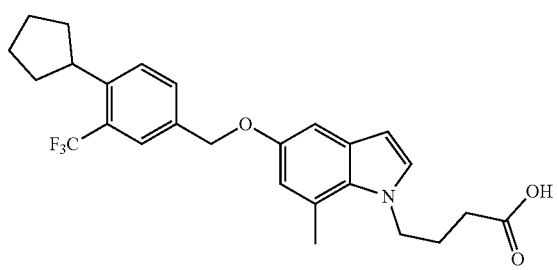

4-(5-((4-cyclopentyl-3-(trifluoromethyl)benzyl)oxy)-7-methyl-1H-indol-1-yl)butyronitrile (4g) (180 mg, 0.41 mmol) was dissolved in a mixed solution of ethanol (2 mL) and water (0.5 mL), and sodium hydroxide (16.35 mg, 0.41 mmol) was added. The reaction solution was heated to 100° C. and stirred for 6 h. The reaction solution was cooled to room temperature and concentrated under reduced pressure. Water (10 mL) was added to the resultant, which was adjusted to pH 6 with hydrochloric acid aqueous solution and extracted with ethyl acetate (20 mL×3) to give an organic phase. The organic phase was dried over anhydrous sodium sulfate, filtered to obtain the filtrate which was then concentrated under reduced pressure. The obtained residue was prepared by high pressure liquid chromatography (acetonitrile/water (containing 0.1% formic acid, gradient elution) to obtain a white solid 4-(5-((4-cyclopentyl-3-(trifluoromethyl)benzyl)oxy)-7-methyl-1H-indol-1-yl)butyric acid (4) (39.71 mg, yield: 21.1%).

$^1$H NMR(400 MHz, DMSO-$d_6$) δ7.70 (d, J=11.2 Hz, 2H), 7.63 (d, J=8.1 Hz, 1H), 7.21 (d, J=3.0 Hz, 1H), 6.95 (d, J=2.2 Hz, 1H), 6.63 (d, J=1.7 Hz, 1H), 6.30 (d, J=3.0 Hz, 1H), 5.11 (s, 2H), 4.29 (t, J=7.2 Hz, 2H), 3.27-3.23 (m, 1H), 2.62 (s, 3H), 2.20 (t, J=7.3 Hz, 2H), 2.04-1.95 (m, 2H), 1.94-1.79 (m, 4H), 1.72-1.54 (m, 4H). MS (ESI) m/z: 460 [M+1].

EXAMPLE 5

4-(7-chlorine-5-((4-cyclopentyl-3-(trifluoromethyl)benzyl)oxy)-1H-indol-1-yl)butyric acid (5)

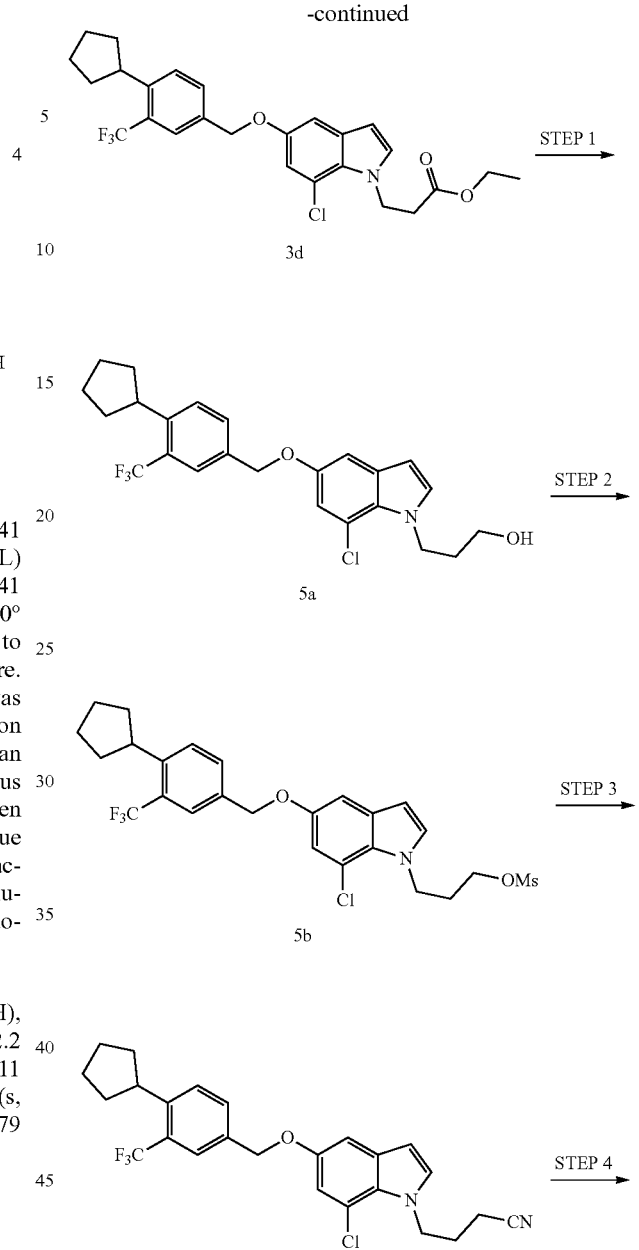

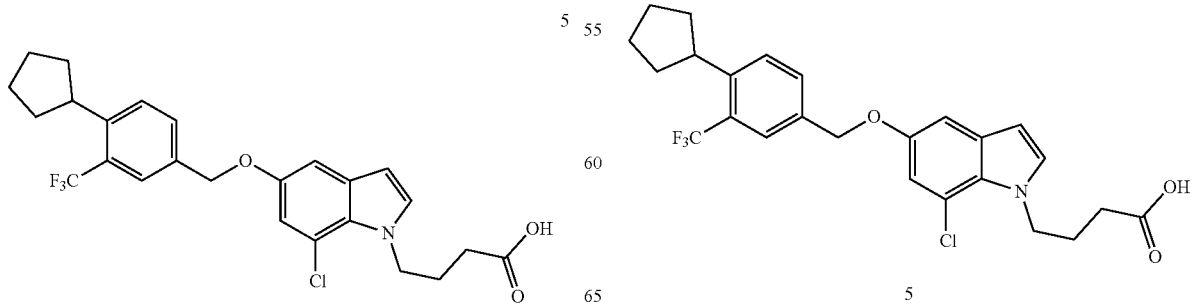

Step 1: 3-(7-chlorine-5-((4-cyclopentyl-3-(trifluoromethyl)benzyl)oxy)-1H-indole-1-yl)propane-1-ol (5a)

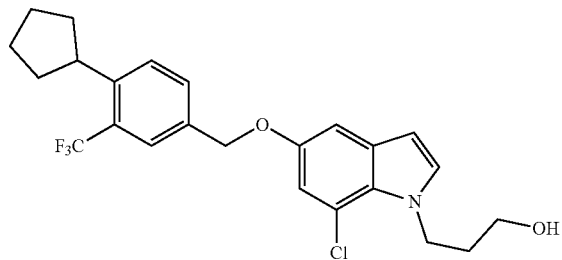

Diisobutyl aluminium hydride solution (1.5 M, 0.54 mL) was added into a solution of 3-(7-chlorine-5-((4-cyclopentyl-3-(trifluoromethyl)benzyl)oxy)-1H-indole-1-yl)ethyl propionate (3d) (200 mg, 0.40 mmol) in tetrahydrofunan (10 mL) at 0° C. The reaction solution was stirred for 1 h at room temperature. Sodium sulfate decahydrate was added to the resulting solution, which was then filtered. The filtrate was concentrated under reduced pressure, and the obtained residue was purified by silica gel column chromatography (ethyl acetate:petroleum ether (v/v)=1:5) to obtain a colorless oil 3-(7-chlorine-5-((4-cyclopentyl-3-(trifluoromethyl)benzyl)oxy)-1H-indole-1-yl)propane-1-ol (5a) (150 mg, yield: 82.0%).

MS (ESI) m/z: 452 [M+1].

Step 2: 3-(7-chlorine-5-((4-cyclopentyl-3-(trifluoromethyl)benzyl)oxy)-1H-indole-1-yl)propyl methanesulfonate (5b)

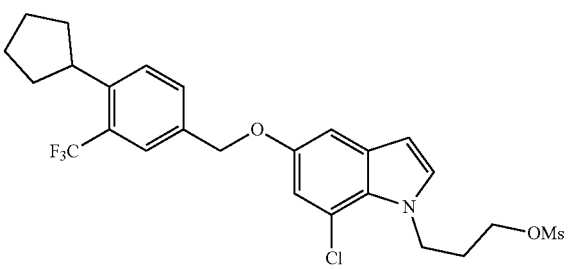

Into a reaction bottle, were added dichloromethane (10 mL), 3-(7-chlorine-5-((4-cyclopentyl-3-(trifluoromethyl)benzyl)oxy)-1H-indole-1-yl)propane-ol (5a) (150 mg, 0.33 mmol) and triethylamine (100.76 mg, 1.00 mmol). Methylsulfonyl chloride (76.05 mg, 0.66 mmol) was added to the reaction system at 0° C., which was stirred at room temperature for 1 h. Water (5 mL) was added and the reaction solution was extracted with ethyl acetate (10 mL×3) to give an organic phase. The organic phase was dried over anhydrous sodium sulfate and filtered. The filtrate was concentrated under reduced pressure to obtain a pale yellow solid 3-(7-chlorine-5-((4-cyclopentyl-3-(trifluoromethyl)benzyl)oxy)-1H-indole-1-yl)propyl methanesulfonate (5b) (160 mg, yield: 90.9%).

MS (ESI) m/z: 530 [M+1].

Step 3: 4-(7-chlorine-5-((4-cyclopentyl-3-(trifluoromethyl)benzyl)oxy)-1H-indole-1-yl)butyronitrile (5c)

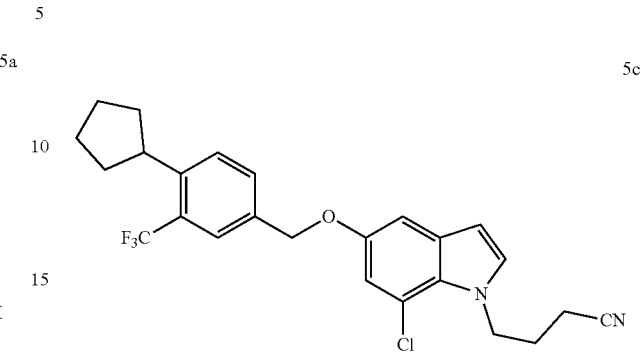

Sodium cyanide (14.80 mg, 0.30 mmol) was added into a solution of 3-(7-chlorine-5-((4-cyclopentyl-3-(trifluoromethyl)benzyl)oxy)-1H-indole-1-yl)propyl methanesulfonate (5b) (160 mg, 0.30 mmol) dissolved in N,N-dimethylformamide (2 mL). The reaction system was heated to 90° C. and reacted for 16 h. Water (5 mL) was added, and the reaction solution was extracted with ethyl acetate (10 mL×3) to give an organic phase. The organic phase was dried over anhydrous sodium sulfate and filtered. The filtrate was concentrated under reduced pressure to obtain a white solid 4-(7-chlorine-5-((4-cyclopentyl-3-(trifluoromethyl)benzyl)oxy)-1H-indole-1-yl)butyronitrile (5c) (120 mg, yield: 86.2%).

MS (ESI) m/z: 461 [M+1].

Step 4: 4-(7-chlorine-5-((4-cyclopentyl-3-(trifluoromethyl)benzyl)oxy)-1H-indole-1-yl)butyric acid (5)

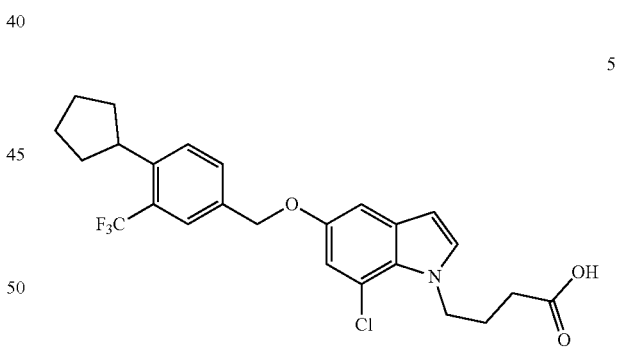

The compound 4-(7-chlorine-5-((4-cyclopentyl-3-(trifluoromethyl)benzyl)oxy)-1H-indole-1-yl)butyric acid (5) was synthesized with 4-(7-chlorine-5-((4-cyclopentyl-3-(trifluoromethyl)benzyl)oxy)-1H-indole-1-yl)butyronitrile(5c) as raw material by the synthesis method described in step 7 of Example 4.

$^1$H NMR(400 MHz, DMSO-d$_6$) δ12.14 (s, 1H), 7.71 (d, J=10.9 Hz, 2H), 7.64 (d, J=8.0 Hz, 1H), 7.35 (d, J=2.7 Hz, 1H), 7.15 (d, J=1.6 Hz, 1H), 6.94 (s, 1H), 6.42 (d, J=2.8 Hz, 1H), 5.16 (s, 2H), 4.44 (t, J=6.8 Hz, 2H), 3.24 (m, 1H), 2.17 (t, J=7.3 Hz, 2H), 1.97 (m, 4H), 1.84 (s, 2H), 1.72-1.55 (m, 4H).

MS (ESI) m/z: 480 [M+1].

EXAMPLE 6

2-(5-((4-cyclopentyl-3-(trifluoromethyl)benzyl)oxy)-1H-indole-1-yl)acetic acid (6)

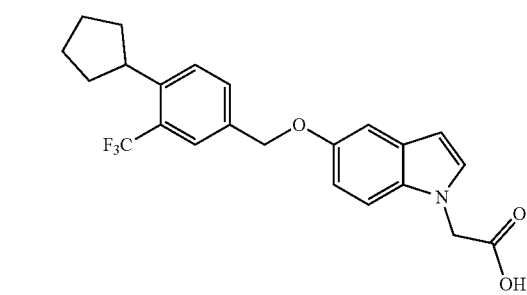

6

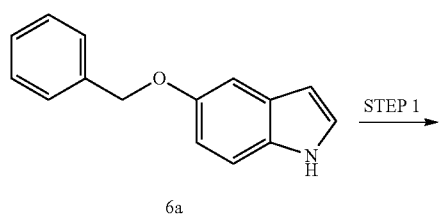

6a

STEP 1

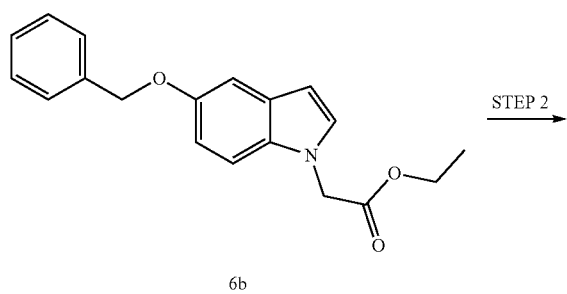

6b

STEP 2

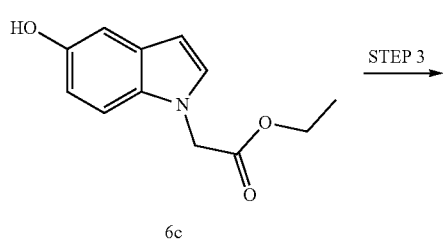

6c

STEP 3

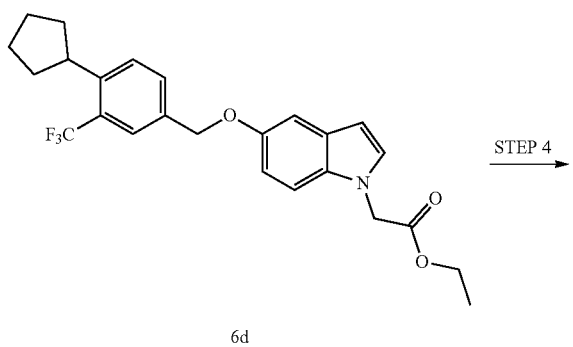

6d

STEP 4

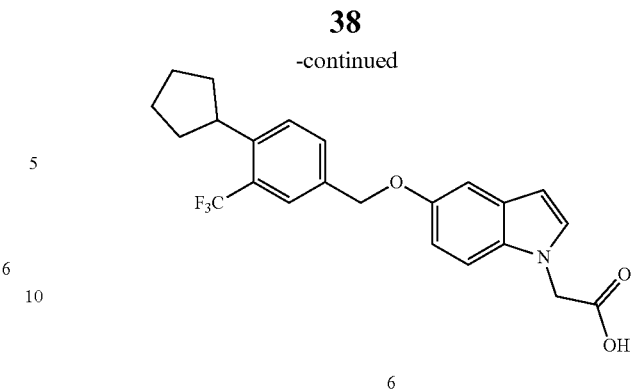

6

Step 1: 2-(5-(benzyloxy)-1H-indole-1-yl)ethyl acetate (6b)

Sodium hydride (215 mg, 5.4 mmol) was added into a solution of 5-(benzyloxy)-1H-indole (6a) (1.0 g, 4.5 mmol) in N, N-dimethylformamide (30 mL) at 0° C. The resulting solution was kept at 0° C. and reacted for 30 min. And then ethyl 2-bromoacetate (899 mg, 5.4 mmol) was added to the reaction system. The reaction was heated to room temperature and stirred for 30 min. Water (10 mL) and ethyl acetate (200 mL) were added to the reaction solution, which was washed with saturated salt water (30 mL×3) to give an organic phase. The organic phase was dried over anhydrous sodium sulfate, filtered to obtain the filtrate which was then concentrated under reduced pressure. The residue was purified by silica gel column chromatography (ethyl acetate: petroleum ether (v/v)=1:10) to obtain a yellow solid 2-(5-(benzyloxy)-1H-indole-1-yl)ethyl acetate (6b) (1.1 g, yield: 79.4%).

MS (ESI) m/z: 310 [M+1].

Step 2: 2-(5-hydroxyl-1H-indole-1-yl)ethyl acetate (6c)

10% palladium carbon (50 mg) was added into a solution of 2-(5-(benzyloxy)-1H-indole-1-yl)ethyl acetate (6b) (500 mg, 1.6 mmol) in tetrahydrofuran (15 mL). The atmosphere (gas) in the system was replaced with hydrogen for three times. The reaction solution was heated to 40° C. under hydrogen atmosphere and stirred for 24 h. The reaction system was filtered to obtain a filter cake, which was then washed with tetrahydrofuran (10 mL) to give an organic phase. The organic phase was combined and concentrated under reduced pressure to give a brown oily crude 2-(5-hydroxyl-1H-indole-1-yl)ethyl acetate (6c), which was directly used for the next step of reaction.

MS (ESI) m/z: 220 [M+1].

Step 3: 2-(5-((4-cyclopentyl-3-(trifluoromethyl)benzyl)oxy)-1H-indole-1-yl)ethyl acetate (6d)

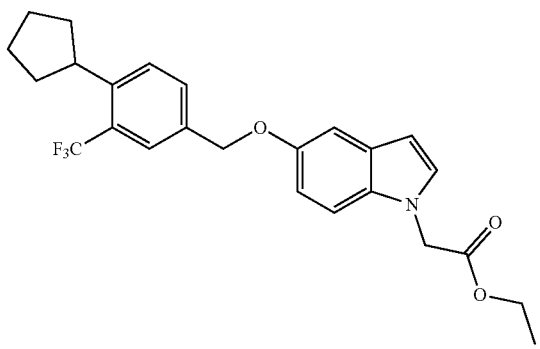

6d 4-(chloromethyl)-1-cyclopentyl-2-(trifluoromethyl)benzene (574 mg, 2.19 mmol) and cesium carbonate (1.78 g, 5.49 mmol) were added into a solution of 2-(5-hydroxyl-1H-indole-1-yl)ethyl acetate (6c) (400 mg, 1.83 mmol) dissolved in N, N-dimethylformamide (20 mL). The reaction system was heated to 60° C. and stirred for 2 h. The resulting solution was diluted with ethyl acetate (100 mL), and washed with saturated sodium chloride solution (20 mL×3) to give an organic phase. The organic phase was dried over anhydrous sodium sulfate, filtered to obtain a filtrate which was then concentrated under reduced pressure. The residue was purified by silica gel column chromatography (ethyl acetate: petroleum ether (v/v)=1:10) to obtain a yellow oil 2-(5-((4-cyclopentyl-3-(trifluoromethyl)benzyl)oxy)-1H-indole-1-yl)ethyl acetate (6d) (520 mg, yield of two steps: 64.0%).

MS (ESI) m/z: 446 [M+1].

Step 4: 2-(5-((4-cyclopentyl-3-(trifluoromethyl)benzyl)oxy)-1H-indole-1-yl)acetic acid (6)

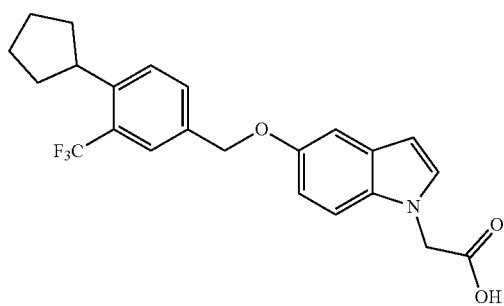

6

The compound 2-(5-((4-cyclopentyl-3-(trifluoromethyl)benzyl)oxy)-1H-indole-1-yl)acetic acid (6) was synthesized with 2-(5-((4-cyclopentyl-3-(trifluoromethyl)benzyl)oxy)-1H-indole-1-yl)ethyl acetate (6d) as raw material by the synthesis method described in step 6 of Example 1.

$^1$H NMR(400 MHz, DMSO-$d_6$) δ7.71 (d, J=10.5 Hz, 2H), 7.63 (d, J=8.1 Hz, 1H), 7.27 (dd, J=5.9, 2.8 Hz, 2H), 7.13 (d, J=2.3 Hz, 1H), 6.85 (dd, J=8.8, 2.4 Hz, 1H), 6.33 (d, J=3.0 Hz, 1H), 5.15 (s, 2H), 4.92 (s, 2H), 3.28-3.20 (m, 1H), 1.99 (m, 2H), 1.90-1.76 (m, 2H), 1.72-1.55 (m, 4H).

MS (ESI) m/z: 418 [M+1].

EXAMPLE 7: DETERMINATION OF S1P1 OVEREXPRESSION CELL ACTIVITY

The following experiments were conducted to detect the activity of the compound on S1P1 overexpression cells by β-arrestin assay.

1. Experimental Materials

| Product name | Supplier | Article No. |
|---|---|---|
| Overexpression of EDG-1 receptor in human osteosarcoma (U2OS) cell line (U2OS-EDG1) | Invitrogen | K1520 |
| Sphingosine 1 phosphate (S1P1) | Sigma | S9666 |
| Trypsin | Gibco | 25200-072 |
| DuPont phosphate buffer (DPBS) | Corning | 21-031-CVR |
| FreeStyle ™ Expression medium | Invitrogen | 12338-018 |
| LiveBLAzer ™ Fluorescent resonance energy transfer B/G loading kit | Invitrogen | K1030-5mg |
| German Greiner 384 well cell culture plate | Greiner | 781091 |
| Premixed primer plate | Labcyte | LP-0200 |

2. Experimental Instruments

| Product name | Supplier Vendor | Article No. |
|---|---|---|
| Cell counter | Beckman coulter | Vi-Cell XR |
| Non-contact NL fluid transfer system | Labcyte | Echo 555 |
| Multimode reader | Perkin Elmer | Envision |

3. Experimental Steps

Day 1: Cell Seeding Plate and Compound Treatment (1) Firstly, the compound was diluted by a 4-fold gradient into 10 concentration points from the concentration of 10 μM in the culture plate by using NL fluid transfer system, with 2 replicates at each concentration point.

(2) Cells were resuspended by using FreeStyle™ expression medium, and the cell density was adjusted to 7,500 cells per 40 μL suspension. The samples with test concentration were added into the well of the cell culture plate, and 40 μL cell suspension was added into the corresponding well.

(3) The above cell plates were incubated overnight in a CO$_2$ incubator with 5% (volume fraction) at 37° C.

Day 2: Detection and Data Analysis (1) The buffer solution was prepared according to the preparation method in the instructions of LiveBLAser™-fluorescence resonance energy transfer B/G loading kit.

(2) 8 μL detection reagent was added to each well, which were shaken and mixed evenly for 1 minute, centrifugated at 1,000 rpm for 10 seconds, and incubated at 23° C. in dark for 2 hours.

3) Detection was performed by multimode reader.
4) The PrismDemo software was used to analyze the data and fit the curve.

4. Experimental Results

| Compound No | IC$_{50}$ (nM) |
|---|---|
| Etrasimod | 4.712 |
| Compound of Example 1 | 0.51 |
| Compound of Example 2 | 3.274 |
| Compound of Example 3 | 0.1477 |
| Compound of Example 4 | 1.727 |
| Compound of Example 5 | 0.2507 |
| Compound of Example 6 | 174.6 |

Multiple tests in different experimental batches show, the test results are basically consistent.

EXAMPLE 8: ANIMAL COLITIS TREATMENT [2,4,6-TRINITROBENZENE SULFONIC ACID (TNBS) INDUCED ULCERATIVE COLITIS IN RATS]

Preparation of molding agent: 5 mL TNBS and 8.953 mL anhydrous ethanol and 26.741 sterilized water for injection.
TNBS comes from Dalian Meilun Biotechnology Co., Ltd.
Source of SPF male SD rats: Shanghai Slake Experimental Animal Co., Ltd.
Animal age at the beginning of the experiment: 8 to 10 weeks;
Animal weight at the beginning of the experiment: about 250 g;
Adaptation time: 5 to 7 days;
Animals were fasted (only water) for 24 hours. After inhalation anesthesia with isoflurane, all rats were perfused with 0.5 mL TNBS ethanol solution per rat (18 mg TNBS/rat) via rectum with latex hose, with the length of the hose entering the rectum of about 8 cm. After withdrawing the hose, the rats remained under isoflurane anesthesia, and kept in the inclined state of hip elevation for 15 minutes.

The rats after modeling were randomly divided into 5 groups: model group, positive control group using drug sulfasalazine (SASP, 360 mg/kg), test substance group using the compound of Example 3 (3 mg/kg), test substance group using Etrasimod (3 mg/kg), test substance group using Ozanimod (10 mg/kg).

At 3 hours after modeling, the animals in each group were administrated with medicine solution by oral gavage (Table 1), 5 mL/kg body weight (10 mL/kg in sulfasalazine group), once a day, for 7 consecutive days, and the feces of the animals and whether there is death were observed every day. On the 8$^{th}$ day, the animals were killed under CO$_2$ overdose anesthesia followed by being dissected, the entire colon tissue was extracted, the contents of the colon were cleaned after longitudinal dissection along the mesenteric side, the colon was weighed and measured for its length, the area of the ulcer was measured, and the general situation was observed and photos were taken. Finally, the colon was fixed in 10% formalin, and H&E staining and histopathological analysis (inflammation, goblet cells, lesion depth, ulcer degree, crypt abscess) were performed.

Wherein, the compound of Example 3 of the invention, purity: 99.74%.
Etrasimod, prepared according to the literature method (the second isomer of Example 1.29 in WO2010/011316A1), purity: 98.47%.
Ozanimod, prepared according to the literature method (compound 86 in WO2011/060392A1), purity: 99.78%.
Sulfasalazine enteric-coated tablets, produced by Shanghai Fuda Pharmaceutical Co., Ltd., 0.25 g/tablet. Enteric coated tablets show yellow to brownish yellow after the coating is removed.
Solutol: Beijing Fengli Jingqiu Pharmaceutical Co., Ltd.
Solvent preparation:
DMSO, Solutol and 0.9% sodium chloride solution were mixed according to the volume ratio of 5:10:85 to prepare the solvent.
Preparation of compound of Example 3 and Etrasimod solution: 27 mg of test substances were taken respectively and dissolved in 45 mL of solvent to obtain corresponding test substance solution.
Ozanimod: 90 mg Ozanimod was dissolved in 45 mL solvent to obtain Ozanimod solution.
Preparation of SASP solution: six sulfasalazine enteric-coated tablets after grinding were added to 41.7 mL 0.5% CMC-Na, and then dissolved by ultrasonic to obtain SASP solution.
Due to the excipient factor of SASP drug preparation, the concentration should not be too high when suspended in 0.5% CMC-Na, otherwise the suspension was uneven and the mobility was poor, so the dose volume of SASP was doubled compared with the compound of Example 3 and Etrasimod.

TABLE 1

Dosage of each group

| Group | Group: Drug | Number of animals | Dosage (mg/kg) | Dose volume (mL/kg) | Concentration of administration (mg/mL) | Method of administration |
|---|---|---|---|---|---|---|
| 1 | Model group: blank control | 10 | — | 5 | — | Oral gavage, once a day for 7 consecutive days |
| 2 | Positive control drug: SASP | 10 | 360 | 10 | 36 | |

TABLE 1-continued

| | | Dosage of each group | | | | |
|---|---|---|---|---|---|---|
| Group | Group: Drug | Number of animals | Dosage (mg/kg) | Dose volume (mL/kg) | Concentration of administration (mg/mL) | Method of administration |
| 3 | Test substance: compound of Example 3 | 10 | 3 | 5 | 0.6 | |
| 4 | Test substance: Etrasimod | 10 | 3 | 5 | 0.6 | |
| 5 | Test substance: Ozanimod | 10 | 10 | 5 | 2 | |

During the experiment, one animal died in each of the other treatment groups except the Ozanimod group.

Experimental Results

Stool

On the next day of TNBS modeling, loose stools occurred in the rats. Formed or semi-formed stool occurred in some rats, but there was obvious blood in the stool. The model rats were accompanied by the symptoms of reduced diet, fatigue, emaciation, bristling hair, and lusterless hair. The blood in the stool and loose stool condition of the rats in each group were improved slowly over time. After 4 days, there were some rats in each group whose fecal excretion was gradually returned to normal, and the rats with abnormal defecation showed a decrease in the amount of defecation. The symptoms of bloody purulent stool of the rats in each administration group after modeling did not show a significant improvement trend compared with those of the rats in the model group at the same time point.

Weight

After TNBS modeling, the weight of the rats in the model group and each administration group showed a downward trend, and the weight began to increase on the fourth day after administration. The weight of rats in the Etrasimod group was similar to that in the model group, while the group using sulfasalazine and the compound of Example 3 showed a certain tendency to inhibit the weight loss of the rats. See Table 2 for the results.

General (Gross) View of Colon

After 7 days of modeling and continuous administration, the rats in the model group and the administration group showed different degrees of colon necrosis and repair. In the rats with severe colon injury symptoms, there was a large amount of fluid accumulated in the abdominal cavity, and the colon injury site was seriously adhered to the surrounding tissues. After colorectal incision, the intestinal mucosa was necrotic to varying degrees. The necrotic mucosa was black, and the colon wall thickened significantly. The diseased colon tissue was inelastic, with an obviously proliferated intestinal wall and obviously shortened colon. The general anatomical view of the rats in each group showed from excellent to poor: group using compound of Example 3>group using sulfasalazine>group using Etrasimod>group using Ozanimod (as shown in the FIGURE).

Colon Weight, Colon Length, and Ulcer Area

Colon weights of the rats with TNBS induced ulcerative colitis decreased after being administrated by oral gavage for 7 consecutive days. The drug efficacy intensity of the test substance is as follows: group using the compound of Example 3 (3 mg/kg)>group using Etrasimod (3 mg/kg)>group using sulfasalazine (360 mg/kg)>model group>group using Ozanimod (10 mg/kg). See Table 3 for the results.

TABLE 2

| | Weight (g) | | | | |
|---|---|---|---|---|---|
| Time | Model group | SASP control group | Compound of Example 3 | Etrasimod group | Ozanimod group |
| Day 1 | 248.7 ± 0.38 | 250.1 ± 0.48 | 247 ± 0.55 | 251.6 ± 0.5 | 247.1 ± 0.64 |
| Day 2 | 221.9 ± 0.49 | 226.4 ± 0.34 | 224.6 ± 0.51 | 225.5 ± 0.56 | 225.6 ± 0.65 |
| Day 3 | 217.5 ± 1.09 | 227.6 ± 1.13 | 226.3 ± 0.85 | 223.9 ± 0.94 | 225.1 ± 0.86 |
| Day 4 | 217.5 ± 1.54 | 231.8 ± 1.59 | 233.6 ± 1.45 | 221.8 ± 1.51 | 225.9 ± 1.39 |
| Day 5 | 220.9 ± 1.94 | 238.6 ± 1.83 | 238.5 ± 1.57 | 224.4 ± 1.73 | 231.3 ± 1.63 |
| Day 6 | 231.4 ± 1.95 | 247.3 ± 1.91 | 245 ± 1.74 | 230.1 ± 2.04 | 239 ± 1.72 |
| Day 7 | 244.6 ± 1.93 | 255 ± 2.01 | 258.8 ± 1.61 | 245.5 ± 1.85 | 247.8 ± 1.74 |
| Day 8 | 254.4 ± 1.89 | 267.9 ± 1.9 | 267.9 ± 1.44 | 255.8 ± 1.6 | 262.8 ± 1.22 |

TABLE 3

| Results | Model group (N = 10) | SASP control group (N = 9) | Compound of Example 3 (N = 9) | Etrasimod group (N = 9) | Ozanimod group (N = 10) |
|---|---|---|---|---|---|
| Colon weight (g) | 4.05 ± 0.88 | 3.35 ± 0.74 | 2.07 ± 0.17 | 2.54 ± 0.25 | 3.30 ± 0.53 |
| Colon length (cm) | 13.77 ± 0.4 | 13.89 ± 0.45 | 13.66 ± 0.63 | 13.56 ± 0.54 | 13.09 ± 0.5 |
| Colon weight/ colon length (g/cm) | 0.29 | 0.24 | 0.15 | 0.19 | 0.25 |
| Ulcer area (mm$^2$) | 422.55 ± 167.58 | 320.23 ± 167.1 | 53.87 ± 24.01 | 177.97 ± 56.5 | 498.04 ± 202.49 |

After multiple repeated tests, the results were basically consistent with this time.

EXAMPLE 9: ANIMAL COLITIS TREATMENT (DSS INDUCED ULCERATIVE COLITIS IN MICE)

Molecular weight of DSS dextran sodium sulfate: 36,000 to 50,000, From MP Biomedical Company.

Preparation of molding agent: preparation of 3.5% DSS: 49 g DSS plus 1,400 mL high-temperature sterilized water.

Source of SPF male C57BL/6 mice: Beijing Weitong Lihua Experimental Animal Technology Co., Ltd.

Animal age at the beginning of the experiment: 6 to 8 weeks;

Animal weight at the beginning of the experiment: 22 to 25 g;

Adaptation time: 3 to 5 days;

The mice were divided into groups according to their weight, 10 mice in each group. The mice were administrated once a day by gavage (or blank) according to the following Table 4.

TABLE 4

| Group | Group: Drug | Number of animals | Dosage (mg/kg) | Dose volume (ml/kg) | Concentration of administration (mg/ml) | Method of administration |
|---|---|---|---|---|---|---|
| 1 | Blank control group | 10 | — | 10 | — | Oral gavage, once a day for 8 consecutive days |
| 2 | Model group | 10 | — | 10 | — | |
| 3 | Compound of Example 3 (30 mg/kg) | 10 | 30 | 10 | 3 | |
| 4 | Compound of Example 3 (20 mg/kg) | 10 | 20 | 10 | 2 | |
| 5 | Compound of Example 3 (10 mg/kg) | 10 | 10 | 10 | 1 | |
| 6 | Compound of Example 3 (6 mg/kg) | 10 | 6 | 10 | 0.6 | |
| 7 | Ozanimod (20 mg/kg) | 10 | 20 | 10 | 2 | |
| 8 | Etrasimod (10 mg/kg) | 10 | 10 | 10 | 1 | |

Animals were given 3.5% DSS solution for free drinking water modeling (the day of modeling was recorded as day 1), and the modeling agent was replaced once every two days for 7 consecutive days, and then (day 8) 3.5% DSS was replaced with ordinary drinking water for another 1 day.

Solution Preparation:

Preparation of solvent 1: 0.66 mL DMSO, 1.32 mL Solutol and 11.22 mL Saline were mixed to prepare 13.2 mL of solvent 1;

Preparation of solvent 2: 0.3 mL DMSO, 0.6 mL Solutol and 5.1 mL Saline were mixed to prepare 6 mL of solvent 2;

Preparation of solution of compound of Example 3: 39.6 mg of compound of Example 3 was dissolved in 13.2 mL of solvent 1 to obtain the solution of compound 1 of Example 3, the solution 1 of compound of Example 3 was diluted with solvent 1 to prepare the solution of compound of Example 3 with concentrations of 2 mg/mL, 1 mg/mL, and 0.6 mg/mL;

Etrasimod solution: 6 mg of Etrasimod was dissolve in 6 mL of solvent 2 to obtain Etrasimod solution;

Ozanimod solution: 12 mg of Etrasimod was dissolved in 6 mL solvent 2 to obtain Ozanimod solution;

Note: Prepare once every two days, and store in refrigerator at 4° C.

Wherein, the purity of compound of Example 3 was 99.74%, Ozanimod and Etrasimod were prepared by the method described in Example 8, and the purities were 99.78% and 98.47% respectively.

Experimental Results

Weight of Mice

The mice were weighed every two days. After the mice began to drink 3.5% DSS solution freely, their weight almost stopped increasing. From the sixth day of continuous modeling, the weight of mice in the model group and administration group decreased significantly, and the weight decreased more significantly with the increase of modeling days. However, the weight of the mice in blank control group who normally drank autoclaved water tended to increase with the increase of feeding days. During the period of day 6-day 9, there was statistically significant difference in the daily weight between the mice with ulcerative colitis induced by 3.5% DSS and the blank group (P<0.05). There was no significant difference among the administration groups, and the results were shown in Table 5-1 and Table 5-2.

TABLE 5-1

| Group | Weight (g) | | | | |
|---|---|---|---|---|---|
| | Day 1 | Day 2 | Day 3 | Day 4 | Day 5 |
| Blank control | 21.6 ± 0.32 | 22.0 ± 0.3 | 21.6 ± 0.27 | 21.7 ± 0.27 | 21.9 ± 0.34 |
| Model | 21.5 ± 0.28 | 21.6 ± 0.28 | 21.4 ± 0.3 | 21.5 ± 0.31 | 21.4 ± 0.46 |
| Compound of Example 3 (30 mg/kg) | 21.5 ± 0.17 | 21.9 ± 0.17 | 21.4 ± 0.34 | 21.1 ± 0.4 | 21.1 ± 0.39 |
| Compound of Example 3 (20 mg/kg) | 21.2 ± 0.34 | 21.7 ± 0.29 | 21.5 ± 0.33 | 21.8 ± 0.34 | 21.5 ± 0.33 |
| Compound of Example 3 (10 mg/kg) | 21.9 ± 0.2 | 22.1 ± 0.2 | 21.4 ± 0.32 | 21.3 ± 0.46 | 21.0 ± 0.6 |
| Compound of Example 3 (6 mg/kg) | 21.3 ± 0.26 | 21.5 ± 0.27 | 21.1 ± 0.3 | 20.9 ± 0.47 | 21.1 ± 0.25 |
| Ozanimod (20 mg/kg) | 21.2 ± 0.19 | 21.7 ± 0.25 | 21.7 ± 0.26 | 21.9 ± 0.33 | 21.5 ± 0.27 |
| Etrasimod (10 mg/kg) | 21.0 ± 0.26 | 21.6 ± 0.24 | 21.4 ± 0.25 | 21.7 ± 0.29 | 21.2 ± 0.27 |

TABLE 5-2

| Group | Weight (g) | | | |
|---|---|---|---|---|
| | Day 6 | Day 7 | Day 8 | Day 9 |
| Blank control | 21.8 ± 0.35 | 21.7 ± 0.37 | 22.4 ± 0.48 | 22.5 ± 0.51 |
| Model | 20.4 ± 0.41# | 19.1 ± 0.42### | 17.8 ± 0.28### | 16.3 ± 0.36### |
| Compound of Example 3 (30 mg/kg) | 20.1 ± 0.58# | 19.5 ± 0.52### | 18.4 ± 0.51### | 17.2 ± 0.48### |
| Compound of Example 3 (20 mg/kg) | 20.3 ± 0.48# | 19 ± 0.46### | 17.4 ± 0.58### | 16.5 ± 0.4### |
| Compound of Example 3 (10 mg/kg) | 20.4 ± 0.45# | 19 ± 0.46### | 17.8 ± 0.4### | 16.2 ± 0.3### |
| Compound of Example 3 (6 mg/kg) | 20.5 ± 0.25# | 19.2 ± 0.23### | 18.1 ± 0.38### | 16.3 ± 0.33### |
| Ozanimod (20 mg/kg) | 20.6 ± 0.54 | 18.9 ± 0.54### | 18.0 ± 0.5### | 16.5 ± 0.49### |
| Etrasimod (10 mg/kg) | 20.5 ± 0.22## | 19.2 ± 0.26### | 18.0 ± 0.3### | 16.6 ± 0.26### |

Note:
p < 0.05,
p < 0.01,
p < 0.001 vs. blank control

Mouse Stool

The mouse stool was observed on its shape, bleeding condition every two days, and scored. Scoring criteria for stool condition: shape: normal (level 1), soft stool (level 2), and loose stool (level 3); traits: normal (level 1), faint redness (level 2), and bloody stool visible to the unaided eye (level 3).

After the mice drank 3.5% DSS solution freely for 5 days, most of the mice in the model group had bloody stools. With the increase of time, the bloody stools became more obvious, and the stools gradually turned to soft and loose stools. The stool condition score also reached the peak at day 8. At day 8, 3.5% DSS was replaced with high-pressure sterilized water and the mice were continued to be administered. After one day, anatomical results showed that group using compound of Example 3 (30 mg/kg), group using compound of Example 3 (20 mg/kg), group using compound of Example 3 (10 mg/kg), and group using compound of Example 3 (6 mg/kg) had the effect of significantly improving blood stool and loose stool in the mice, which was statistically significant difference compared with the model group (P<0.05); the stool condition of animals had not significant improvement in Ozanimod (20 mg/kg) and Etrasimod (10 mg/kg) groups, and the results were shown in Table 6.

TABLE 6

| Group | Total stool scores | | |
|---|---|---|---|
| | Day 7 | Day 8 | Day 9 |
| Blank control | 2.0 ± 0*** | 2.0 ± 0*** | 2.0 ± 0*** |
| Model | 5.8 ± 0.13 | 6.0 ± 0 | 5.8 ± 0.15 |
| Compound of Example 3 (30 mg/kg) | 5.4 ± 0.32 | 5.6 ± 0.23 | 4.6 ± 0.39* |
| Compound of Example 3 (20 mg/kg) | 5.7 ± 0.21 | 5.9 ± 0.11 | 4.8 ± 0.31* |
| Compound of Example 3 (10 mg/kg) | 5.7 ± 0.22 | 5.7 ± 0.22 | 4.8 ± 0.26* |
| Compound of Example 3 (6 mg/kg) | 5.6 ± 0.17 | 5.9 ± 0.11 | 4.6 ± 0* |
| Ozanimod (20 mg/kg) | 5.9 ± 0.11 | 6.0 ± 0 | 5.1 ± 0 |
| Etrasimod (10 mg/kg) | 6.0 ± 0 | 5.9 ± 0.11 | 5.6 ± 0 |

Note:
*p < 0.05,
**p < 0.01,
***p < 0.001 vs. model control

Weight and Length of Mouse Colon

After the last administration (8 consecutive days), the animals were dissected on the next day (day 9), the colon was separated, the whole colon was photographed, and the colon length was measured. Then the colon was cut longitudinally along the mesenteric side to remove the contents, which was weighed and observed on the integrity of the colonic mucosa. The colon was then fixed in 10% formalin.

After freely drinking 3.5% DSS solution for 7 days and then fed high-pressure sterilized water for another day, the mice had atrophic colon. The mice in the model group had a significantly reduced colon weight compared with the mice in the control group who drank high-pressure sterilized water freely, with a statistically significant difference (P<0.05). At the same time, the mice in the model group also had a significantly shortened colon length, with a statistically significant difference compared with the blank group (P<0.001) (Table 7).

Administering the test substance (compound of Example 3) through oral gavage for 8 consecutive days had certain inhibitory effect on colon atrophy in the mice. The colon weight of each administration group was significantly heavier than that of the model group, wherein, the colon weight of group using the compound of Example 3 (20 mg/kg), the group using the compound of Example 3 (10 mg/kg), the group using the compound of Example 3 (6 mg/kg), and the group using Etrasimod (10 mg/kg) had a statistically significant difference compared with that of the model group (P<0.05). The colon length of the group using the compound of Example 3 (30 mg/kg), the group using the compound of Example 3 (20 mg/kg), and the group using Ozanimod (20 mg/kg) was longer than that of the model group. See Table 7 for the results.

TABLE 7

| Group | N | Colon weight (g) | Colon length (cm) |
|---|---|---|---|
| Blank control | 10 | 0.162 ± 0.01* | 52.367 ± 2.01*** |
| Model | 8 | 0.138 ± 0.01 | 40.916 ± 1.5 |
| Compound of Example 3 (30 mg/kg) | 9 | 0.162 ± 0.01 | 41.311 ± 1.25 |
| Compound of Example 3 (20 mg/kg) | 9 | 0.163 ± 0.01* | 44.892 ± 1.83 |
| Compound of Example 3 (10 mg/kg) | 9 | 0.164 ± 0.01* | 39.638 ± 0.76 |
| Compound of Example 3 (6 mg/kg) | 9 | 0.164 ± 0.01* | 39.061 ± 1.17 |
| Ozanimod (20 mg/kg) | 7 | 0.157 ± 0.01 | 43.82 ± 1.6 |
| Etrasimod (10 mg/kg) | 9 | 0.169 ± 0.01* | 37.417 ± 1.18 |

Note:
***p < 0.001,
*p < 0.05 vs. model

Death

By the end of the test period, the number of dead animals were 3 in the Ozanimod group, 2 in the model group, and 1 in the other administration groups.

What is claimed is:

1. A compound selected from the group consisting of:

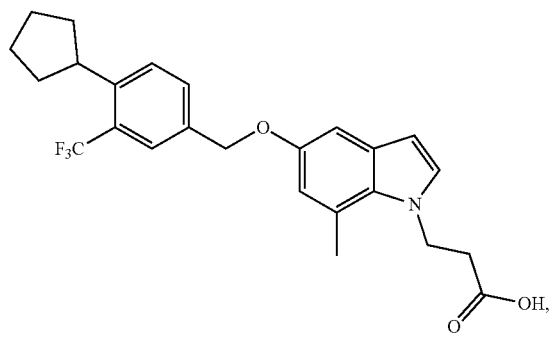

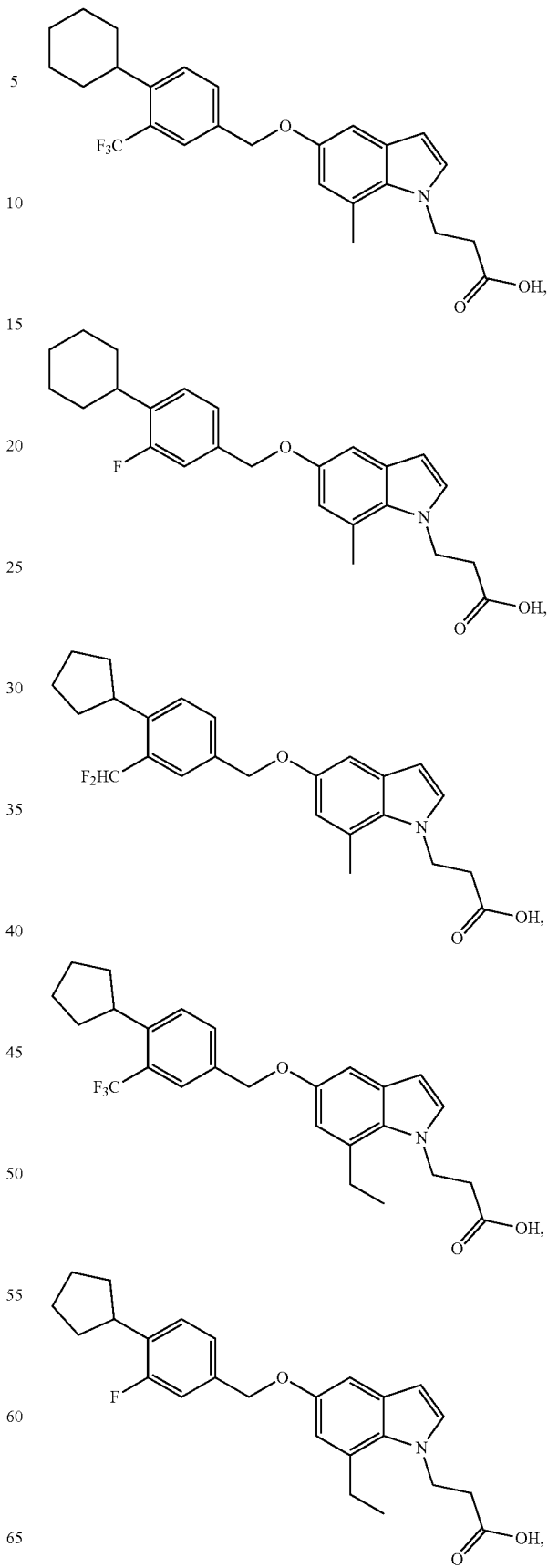

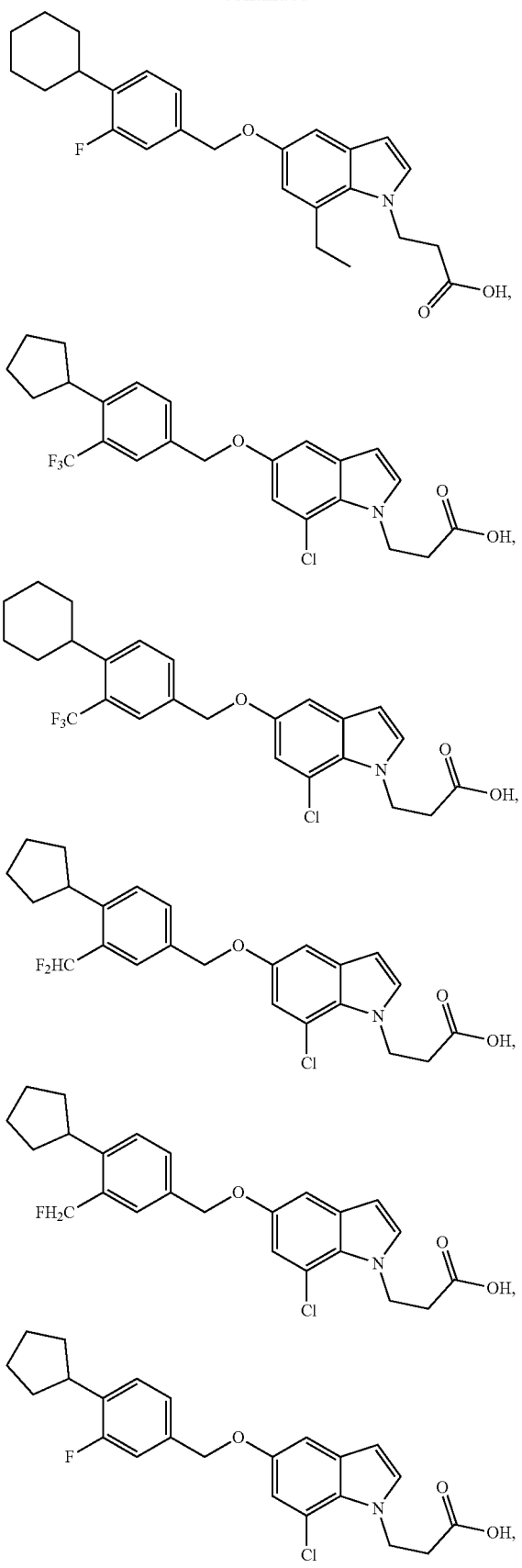

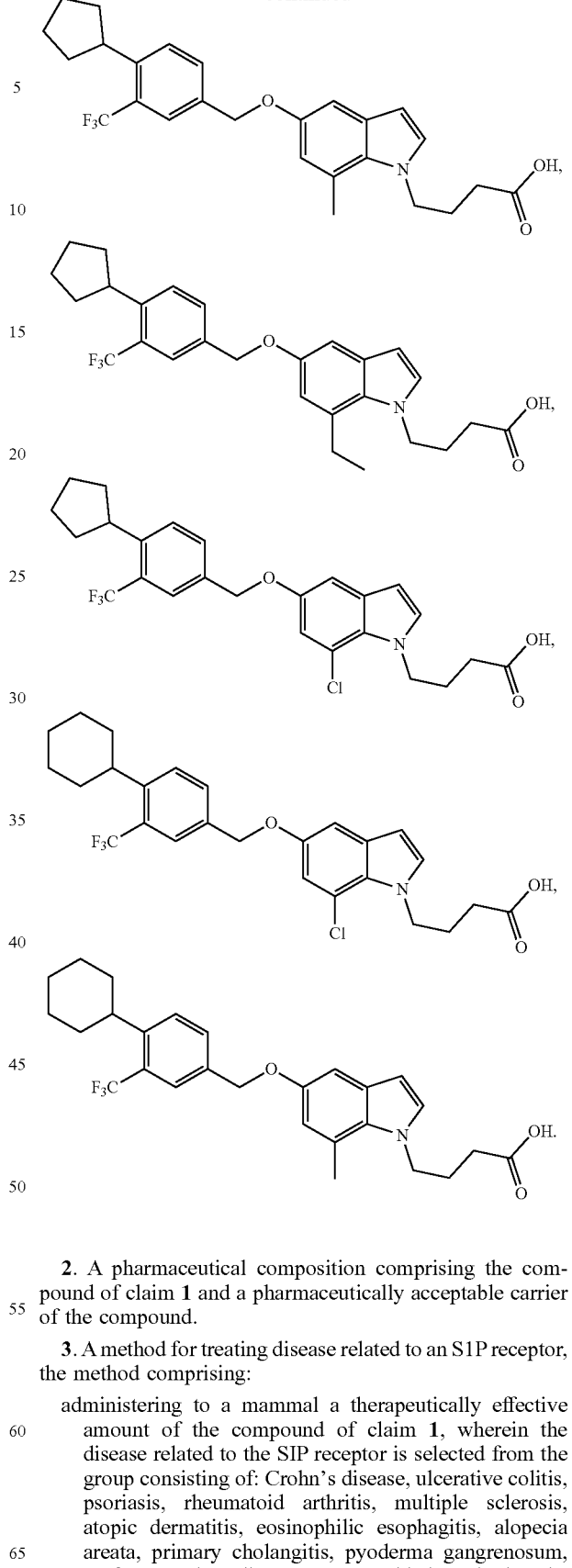

2. A pharmaceutical composition comprising the compound of claim 1 and a pharmaceutically acceptable carrier of the compound.

3. A method for treating disease related to an S1P receptor, the method comprising:

administering to a mammal a therapeutically effective amount of the compound of claim 1, wherein the disease related to the SIP receptor is selected from the group consisting of: Crohn's disease, ulcerative colitis, psoriasis, rheumatoid arthritis, multiple sclerosis, atopic dermatitis, eosinophilic esophagitis, alopecia areata, primary cholangitis, pyoderma gangrenosum, graft-versus-host disease, amyotrophic lateral sclerosis, systemic lupus erythematosus, type I diabetes arteriosclerosis, atherosclerosis, scleroderma, autoimmune hepatitis, acne, microbial infection, and viral infection.

* * * * *